United States Patent
Kobayashi

(10) Patent No.: US 8,494,230 B2
(45) Date of Patent: Jul. 23, 2013

(54) IMAGE DEFORMING APPARATUS, IMAGE DEFORMING METHOD, AND IMAGE DEFORMING PROGRAM

(75) Inventor: Ayako Kobayashi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 879 days.

(21) Appl. No.: 12/548,361

(22) Filed: Aug. 26, 2009

(65) Prior Publication Data

US 2010/0054620 A1 Mar. 4, 2010

(30) Foreign Application Priority Data

Aug. 27, 2008 (JP) ................................ 2008-217922

(51) Int. Cl.
*G06K 9/00* (2006.01)
*G06K 9/32* (2006.01)

(52) U.S. Cl.
USPC .......................................... 382/118; 382/293

(58) Field of Classification Search
USPC ................. 382/100, 115, 118, 256, 276, 293; 340/5.52–5.54, 5.82–5.84
See application file for complete search history.

(56) References Cited

U.S. PATENT DOCUMENTS

| 5,815,601 | A  | * | 9/1998 | Katata et al. | ................... | 382/232 |
| 6,621,938 | B1 | * | 9/2003 | Tanaka et al. | ................... | 382/276 |
| 6,836,554 | B1 | * | 12/2004 | Bolle et al. | ...................... | 382/116 |
| 7,676,063 | B2 | * | 3/2010 | Cohen et al. | ................... | 382/103 |
| 2003/0174890 | A1 | * | 9/2003 | Yamauchi | ..................... | 382/199 |
| 2006/0204034 | A1 | * | 9/2006 | Steinberg et al. | ............. | 382/103 |
| 2006/0215017 | A1 | * | 9/2006 | Cohen et al. | ............... | 348/14.16 |
| 2010/0128957 | A1 | * | 5/2010 | Shinden | ....................... | 382/132 |

FOREIGN PATENT DOCUMENTS

| JP | 2000-101818 A | 4/2000 |
| JP | 2003-334194 A | 11/2003 |
| JP | 2004-318204 A | 11/2004 |
| JP | 2005-176230 A | 6/2005 |
| JP | 2007-043263 A | 2/2007 |
| JP | 2007-074664 A | 3/2007 |

\* cited by examiner

*Primary Examiner* — Chan S Park
*Assistant Examiner* — Mia M Thomas
(74) *Attorney, Agent, or Firm* — Kilpatrick Townsend & Stockton LLP

(57) ABSTRACT

An image processing apparatus includes an area setting unit, an image deformation unit, and a face deformation unit. The area setting unit sets, in a target image that includes a face image, an area including the face image as a compression area. The image deformation unit compresses the compression area in a specific direction at a predetermined compression rate. The face deformation unit deforms the face image by expansion amount determined on the basis of the compression rate in such a manner that at least a part of the face image is expanded in the specific direction.

19 Claims, 14 Drawing Sheets

FIG. 9

|  | H | V |
|---|---|---|
| D11 | -10 | 2 |
| D21 | -5 | 2 |
| D31 | 5 | 2 |
| D41 | 10 | 2 |
| D12 | -19 | -4 |
| D22 | -10 | -4 |
| D32 | 10 | -4 |
| D42 | 19 | -4 |
| D13 | -19 | -7 |
| D23 | -10 | -7 |
| D33 | 10 | -7 |
| D43 | 19 | -7 |

FIG. 15A
FIG. 15B
FIG. 15C

FIG. 16

|     | H   | V   |
| --- | --- | --- |
| D11 | 3   | 15  |
| D21 | 8   | 15  |
| D31 | -8  | 15  |
| D41 | -3  | 15  |
| D12 | -7  | -4  |
| D22 | -10 | -4  |
| D32 | 10  | -4  |
| D42 | 7   | -4  |
| D13 | -19 | -7  |
| D23 | -10 | -7  |
| D33 | 10  | -7  |
| D43 | 19  | -7  |

IMAGE DEFORMING APPARATUS, IMAGE DEFORMING METHOD, AND IMAGE DEFORMING PROGRAM

Priority is claimed under 35 U.S.C. §119 to Japanese Application No. 2008-217922 filed on Aug. 27, 2008, which is hereby incorporated by reference in its entirety.

BACKGROUND

1. Technical Field

The present invention relates to an image processing apparatus, an image processing method, and an image processing program.

2. Related Art

An image processing technique for deforming an image such as a digital image is known. For example, an image processing technique for deforming a face is disclosed in JP-A-2004-318204. In the image processing technique disclosed in JP-A-2004-318204, a partial area on the image of a face (an area of a cheek image) is set as a correction area. The correction area is segmented into a plurality of sub areas in accordance with a predetermined pattern. Then, an image is expanded or compressed with a scaling factor that is set for each sub area. As a result, the face is deformed.

When an image contains a person including a face, a user sometimes desires to obtain a deformed (i.e., corrected) image that represents a body shape conforming to his/her preference. For example, a user prefers an image of a slim and slender figure. However, if deformation processing is performed uniformly on an area of an image that contains a person, the face of the person will also be affected by the deformation processing. As a result, the vertical-to-horizontal ratio of the face will change substantially. If the ratio changes substantially, a user will feel that a processed person image is strange or unnatural even when the image represents a slim and slender figure as s/he desires.

SUMMARY

An advantage of some aspects of the invention is to provide an image processing apparatus, an image processing method, and an image processing program each of which makes it possible to easily obtain a deformed image that looks nice as a result of the deformation of an original image containing a person.

In order to address the above-identified problems without any limitation thereto, an image processing apparatus according to an aspect of the invention includes: an area setting section that sets, in a target image that includes a face image, an area including the face image as a compression area; an image deforming section that compresses the compression area in a specific direction at a predetermined compression rate; and a face deforming section that deforms the face image by expansion amount determined on the basis of the compression rate in such a manner that at least a part of the face image is expanded in the specific direction. In the configuration of an image processing apparatus according to an aspect of the invention, a face deforming section deforms a face image by expansion amount determined on the basis of the compression rate of a compression area in such a manner that at least a part of the face image included in the compression area is expanded in a specific direction. Therefore, after the compression of the compression area by the image deforming section, the vertical-to-horizontal ratio of a face in the resultant image is not substantially affected. Thus, it is possible to obtain such a processed image including the compressed area that gives no sense of strangeness or unnaturalness to a user. The sequential order of the processing of the image deforming section and the processing of the face deforming section is not limitedly specified herein.

The image processing apparatus may further include an instruction receiving section that receives an instruction given from the outside for making a face look smaller. In such a configuration, the face deforming section may reduce expansion amount that is applied to at least a part of the face image mentioned above when the instruction receiving section has received the instruction. With such a preferred configuration, it is possible to obtain such a processed image including the compressed area that gives no sense of strangeness or unnaturalness to a user. In addition, the size of a face in the processed image is reduced moderately.

The face deforming section may determine the expansion amount on the basis of a value that is calculated as a predetermined percentage of a value of the compression rate. For example, if the value of the compression rate is 20%, the face deforming section may set a certain percentage (i.e., ratio) of the value of the compression rate as the expansion amount. As described above, instead of using expansion amount that is too large to completely offset the effects of the compression of a compression area for the expansion of a face image, the amount of expansion of the face image is determined on the basis of a value that is calculated as a predetermined percentage of a value of the compression rate. By this means, as a result of the processing of the image deforming section and the processing of the face deforming section, it is possible to obtain a processed image having an optimum balance between the size of a face and the size of a body in the compressed area.

The face deforming section may determine compression amount on the basis of a value that remains after subtracting the predetermined percentage value from the value of the compression rate and then deform the face image by the determined compression amount so as to compress at least a part of the face image in a direction orthogonal to the specific direction. With such a preferred configuration, the face image is expanded in the specific direction and compressed in the direction orthogonal to the specific direction. By this means, as a result of the processing of the image deforming section and the processing of the face deforming section, it is possible to obtain a processed image having an optimum balance between the size of a face and the size of a body in the compressed area.

The face deforming section may limit the amount of expansion applied to an area outside a predetermined face organ. With such a preferred configuration, as a result of the processing of the image deforming section and the processing of the face deforming section, it is possible to obtain a processed image having an optimum balance between the size of a face and the size of a body in the compressed area. In addition, the processed image gives a firm-face impression at an area outside a predetermined face organ. For example, cheeks and a chin do not look flabby.

The area setting section may divide the target image into the compression area and an area excluding the compression area with the use of a line orthogonal to the specific direction. With such a preferred configuration, when the image of a person is included in the compression area, it is possible to obtain a processed image that is not perceived by a user as strange or unnatural because the vertical-to-horizontal ratio of a face does not substantially change while slimming the body shape of the person moderately as a result of compression.

In the foregoing summary explanation, the technical concept of the invention is applied to an image processing apparatus. However, the scope of the invention is not limited to an image processing apparatus. For example, the concept of the invention may be applied to an image processing method that includes steps corresponding to the plurality of means of the image processing apparatus described above. As another example, it may be applied to an image processing program that causes a computer to execute functions corresponding to the plurality of means of the image processing apparatus described above. Each of the image processing apparatus, the image processing method, and the image processing program may be embodied as hardware such as a personal computer, a server, or the like. Or, it may be embodied as various kinds of product, including but not limited to, an image input device such as a digital still camera, a scanner, and the like, and an image output device such as a printer, a projector, a photo viewer, and the like.

BRIEF DESCRIPTION OF THE DRAWINGS

The invention will be described with reference to the accompanying drawings, wherein like numbers reference like elements.

FIG. 9 is a table that shows an example of the amount of movement of each division point according to an embodiment of the invention.

FIG. 15A is a diagram that schematically illustrates an example of the arrangement of pixels in a target image before one-direction deformation processing according to an embodiment of the invention.

FIG. 15B is a diagram that schematically illustrates an example of a corresponding-number-of-pixels table according to an embodiment of the invention.

FIG. 15C is a diagram that schematically illustrates an example of the arrangement of pixels in an image that has been subjected to one-direction deformation processing according to an embodiment of the invention.

FIG. 16 is a table that shows an example of the amount of movement of each division point according to an embodiment of the invention.

DESCRIPTION OF EXEMPLARY EMBODIMENTS

In the following description, exemplary embodiments of the present invention are explained in order to clarify the technical concepts thereof summarized as above. The embodiments of the invention are organized into the following three sections in this specification.

Figure 1:
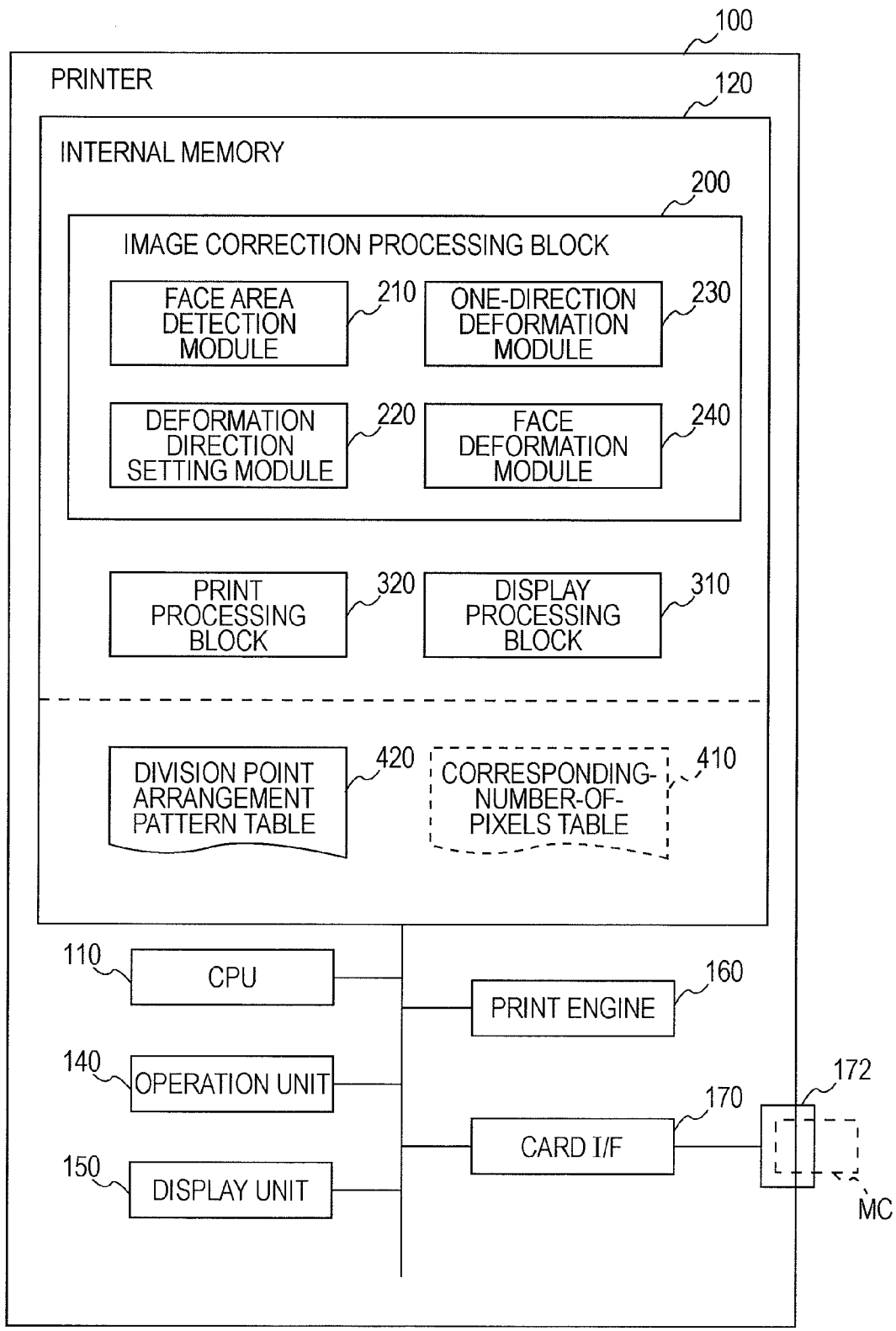
FIG. 1 is a diagram that schematically illustrates an example of the configuration of a printer, which is an example of an image processing apparatus according to an embodiment of the invention.

1. Overall Configuration of Image Processing Apparatus
2. Image Correction Processing
3. Another Embodiment 1. Overall Configuration of Image Processing Apparatus FIG. 1 is a diagram that schematically illustrates an example of the configuration of a printer 100, which is an example of an image processing apparatus according to an exemplary embodiment of the invention. The printer 100 is a color ink jet printer having a so-called direct print capability. As a direct-printing device, the printer 100 outputs a print image on the basis of image data read out of a storage medium such as a memory card MC or the like. The printer 100 is provided with an internal memory 120, a CPU 110, an operation unit 140, a display unit 150, a print engine 160, a card interface (I/F) 170, and a card slot 172.

The internal memory 120 is made up of a ROM and a RAM. The internal memory 120 includes an image correction processing unit 200, a display processing unit 310, and a print processing unit 320 as functional blocks thereof. The image correction processing block 200 is a computer program that is run under a predetermined operating system in order to perform image correction processing. A more detailed explanation of the image correction processing will be given later. The image correction processing block 200 includes a face area detection unit 210, a deformation direction setting unit 220, and a one-direction deformation unit 230 as program modules thereof. The one-direction deformation module 230 performs one-direction deformation processing with the use of a buffer space, which is a temporary memory area provided in the RAM, while looking up a corresponding-number-of-pixels table 410. The one-direction deformation processing is a kind of image correction processing according to the present embodiment of the invention. The one-direction deformation module 230 described in this specification corresponds to, as a non-limiting example thereof, a combination of an area setting section and an image deforming section included in the recitation of appended claims. In addition to the face area detection module 210, the deformation direction setting module 220, and the one-direction deformation module 230, the image correction processing block 200 further includes a face deformation unit 240 as a program module thereof The face deformation module 240 performs face deformation processing while looking up a division point arrangement pattern table 420. The face deformation processing is a kind of image correction processing according to the present embodiment of the invention. The function of each of these modules will be explained later.

The display processing block 310 is a display driver that controls the display unit 150 so that a processing menu, a message, an image, and the like are displayed on the display unit 150. The print processing block 320 is a computer program that generates print data, which specifies the amount of ink for each pixel, by performing predetermined processing such as color conversion processing and halftone processing on image data and controls the print engine 160 so that the printing of an image is performed on the basis of the generated print data. An example of the image data that is subjected to color conversion processing and halftone processing performed by the print processing block 320 is corrected image data, which is image data that represents an image after the execution of image correction by the image correction processing block 200. The CPU 110 reads the programs explained above out of the internal memory 120 and then executes the read-out programs, thereby implementing the respective functions thereof.

The operation unit 140 is provided with buttons, a touch panel, and the like. The operation unit 140 accepts an input such as an instruction given by a user. The display unit 150 is configured as, for example, a liquid crystal display. The print engine 160 is a printing mechanism that is operated so as to perform printing on the basis of the print data that is sent from the print processing block 320. The card I/F 170 is an interface for making access to a memory card MC that is inserted in the card slot 172 for data interaction. The printer 100 may be provided with other interfaces in addition to the card I/F 170 so that it can perform data communication with other devices, for example, a digital still camera, a personal computer, and the like. The components explained above are connected to one another via a bus.

The printer 100 performs face deformation processing and one-direction deformation processing on an image that includes a person as an image part thereof in order to deform the entire person image, thereby making the person look slim and slender. In the following description of this specification, such deformation may be referred to as "sliming". In addition, image correction processing including the face deformation processing and the one-direction deformation processing may be referred to as "sliming correction processing". If the slenderness ratio, that is, the vertical-to-horizontal ratio of the face of a person in an image changes to an intolerable degree, a user will feel something strange or unnatural when s/he observes the processing result. In this respect, in the sliming correction processing according to the present embodiment of the invention, the printer 100 deforms an original unprocessed image so that a user will feel nothing strange or unnatural, which means that the deformation-processed image looks nice. In addition to the sliming correction processing, the printer 100 can perform another type of deformation processing that makes the face of a person in an image look smaller. In the following description of this specification, such deformation processing may be referred to as "face-size reduction correction".

2. Image Correction Processing

Figure 2:
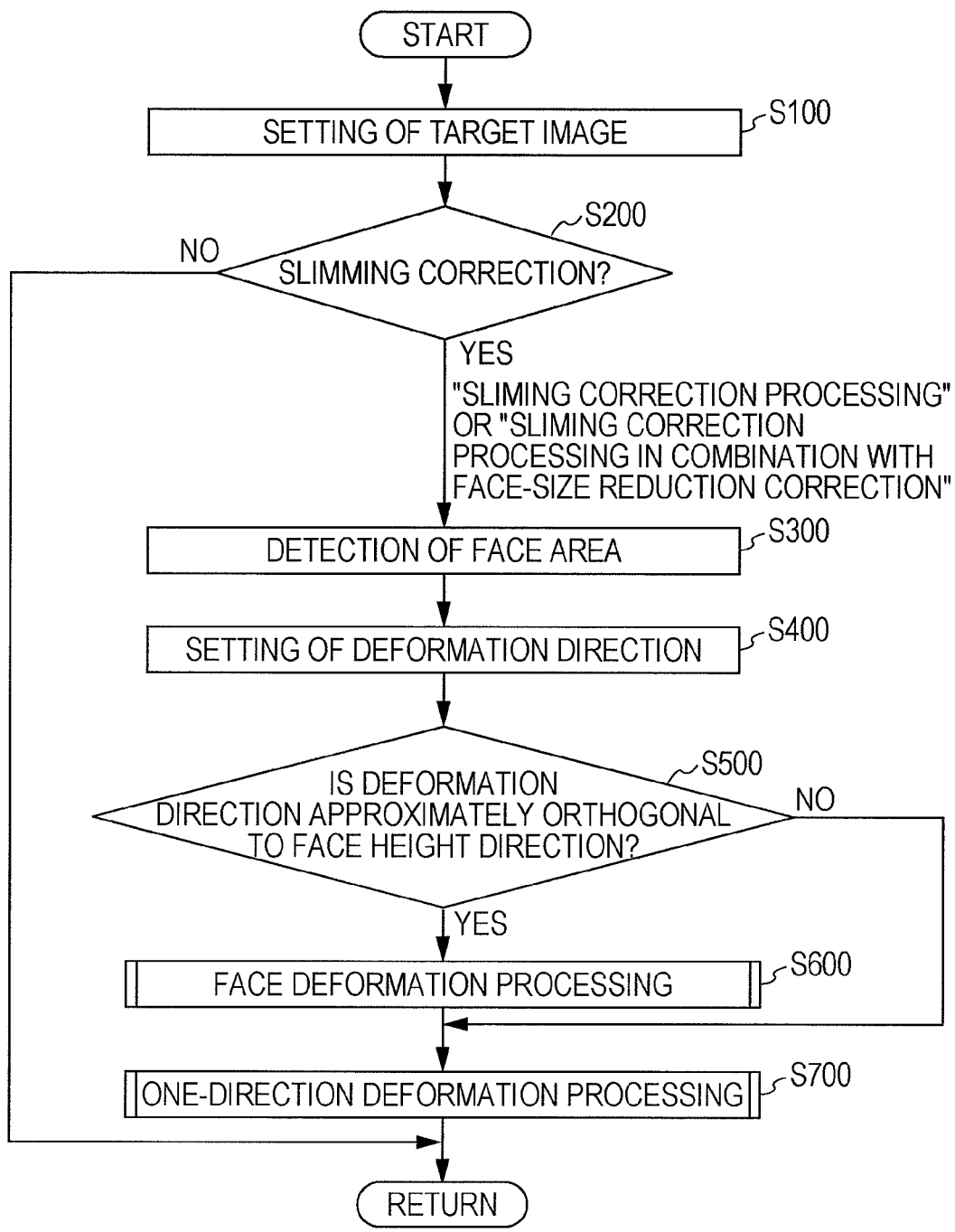
FIG. 2 is a flowchart that schematically illustrates an example of image correction processing according to an embodiment of the invention.

FIG. 2 is a flowchart that schematically illustrates an example of image correction processing performed by the printer 100. In the following explanation of image correction processing according to the present embodiment of the invention, each step thereof is denoted as S with a step number, as in S100, S200, or the like. Note that the term "step" is omitted hereafter. In S100, the image correction processing block 200 sets, that is, acquires, a target image. The target image is an image that is the target of image correction processing, for example, an image on which a user desires to perform the image correction processing. For example, the target image is set as follows. When a memory card MC is inserted into the card slot 172, the display processing block 310 causes the display unit 150 to display a user interface that contains at least one of images that are stored in the memory card MC. The user interface displayed on the screen of the display unit 150 is hereafter abbreviated as UI. Then, the image correction processing block 200 sets a target image in accordance with an input made by a user through the UI.

Figure 3:
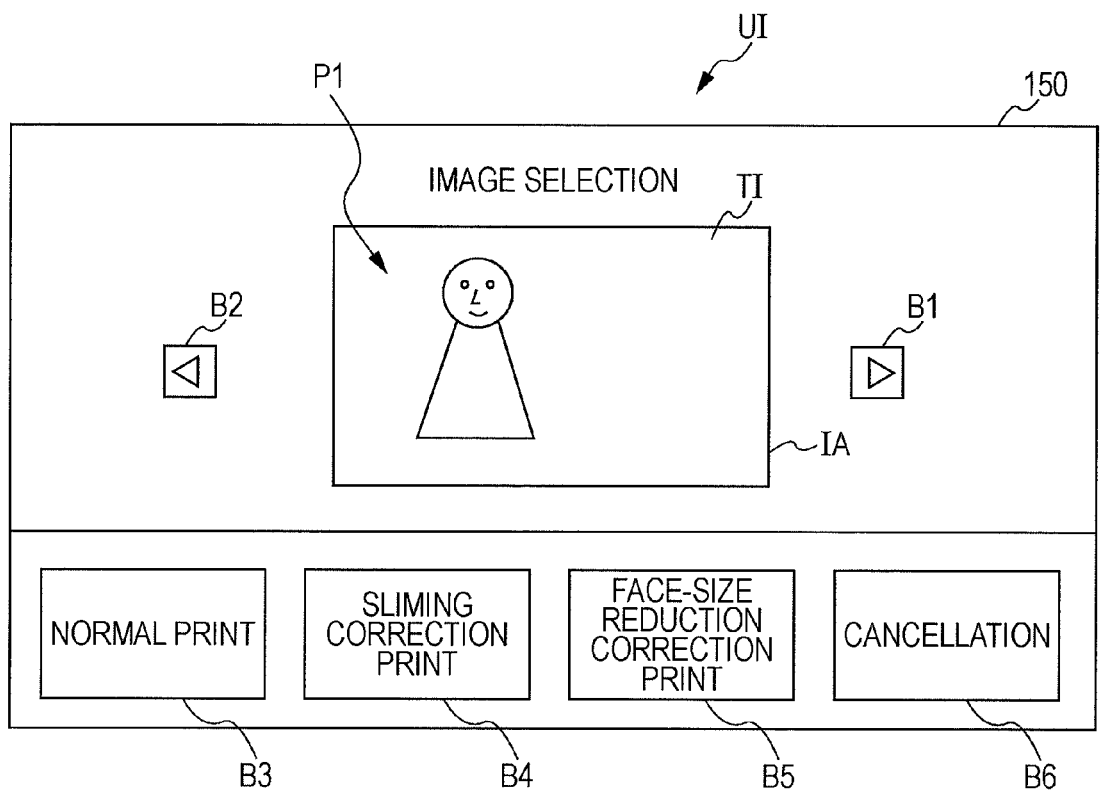
FIG. 3 is a diagram that schematically illustrates an example of a UI according to an embodiment of the invention.

FIG. 3 is a diagram that schematically illustrates an example of a UI that is displayed on the screen of the display unit 150. The UI includes, for example, an image display window area IA, an image changeover button B1, another image changeover button B2, a normal print button B3, a sliming correction print button B4, face-size reduction correction print button B5, and a cancellation button B6. While monitoring the image display window area IA, a user operates the image changeover buttons B1 and B2 so as to select a target image. Then, the user presses down, for example, clicks, any of the normal print button B3, the sliming correction print button B4, and the face-size reduction correction print button B5. By this means, the user can instruct the image correction processing block 200 to set the selected target image. In the illustrated example of FIG. 3, an image T1 that contains a person P1 is selected as a target image. When the user presses down any of the normal print button B3, the sliming correction print button B4, and the face-size reduction correction print button B5 with the image T1 being selected, the image correction processing block 200 sets the selected image T1 as the target image. As a modification example of user-interface display illustrated in FIG. 3, a UI may contain and show a plurality of images stored in the memory card MC, for example, in a thumbnail view.

When the user presses down the sliming correction print button B4, the image correction processing block 200 performs sliming correction processing on the target image. A more detailed explanation of the sliming correction processing performed by the image correction processing block 200 will be given later. On the other hand, when the user presses down the face-size reduction correction print button B5, the image correction processing block 200 performs "sliming correction processing in combination with face-size reduction correction" on the target image. A more detailed explanation of the "sliming correction processing in combination with face-size reduction correction" will be given later. The face-size reduction correction print button B5 illustrated in FIG. 3, which is a component of the UI, is a non-limiting example of an instruction receiving section that receives an instruction given from the outside for making one's face look smaller as recited in an appended claim. Notwithstanding the above, the image correction processing block 200 may be modified to perform the "sliming correction processing in combination with face-size reduction correction" when both of the sliming correction print button B4 and the face-size reduction correction print button B5 are pressed down. After completing the operation procedure of the flowchart illustrated in FIG. 2, the printer 100 prints out an image that has been subjected to image correction processing. When a user presses down the normal print button B3, the printer prints out the target image as it is, that is, without performing the sliming correction processing and the "sliming correction processing in combination with face-size reduction correction".

In S200, the image correction processing block 200 judges whether the execution of either one of the "sliming correction processing" and the "sliming correction processing in combination with face-size reduction correction" is instructed through the operation of the corresponding button(s) of the UI by the user. If it is judged that the execution of either one of the "sliming correction processing" and the "sliming correction processing in combination with face-size reduction correction" is instructed, the process proceeds to S300, followed by subsequent processing. If not, the processing flow of the flowchart ends here. In the following description of this specification, it is assumed that the user pressed down the sliming correction print button B4 in S100 so as to instruct that the sliming correction processing should be executed. The explanation is continued on the basis of such an assumption.

In S300, the face area detection module 210 reads image data that represents the target image out of the memory card MC. The read image data is taken into the internal memory 120. In addition, in S300, the face area detection module 210 detects a face area in the target image. The face area is defined as an area that includes at least a part of a face image included in the target image. The area defined as the face area is expected to include, at least, predetermined face parts (i.e., face organs) such as eyes, a nose, and a mouth. The face area detection module 210 analyzes the image data that represents the target image so as to detect a rectangular area that is expected to include the face parts as the face area. The detection of the face area can be performed by means of a known detection method, for example, a pattern matching method that utilizes a template. An example of the pattern matching method is described in JP-A-2006-279460. As a substitute for the pattern matching method, the face area detection module 210 can use any method as long as the module 210 can detect the face area by means of the alternative method. For example, the face area detection module 210 may detect the face area with the use of a neural network that has a pre-learned function of, when various kinds of information on an image (e.g., luminance/brightness information, edge amount information, contrast information, and the like) is inputted for a unit of a rectangular area (i.e., detection target area) set inside the target image, outputting information that indicates whether the detection target area is a face area or not. As another example, the face area detection module 210 may judge whether it is a face area or not for each detection target area while utilizing a support vector machine.

Figure 4:
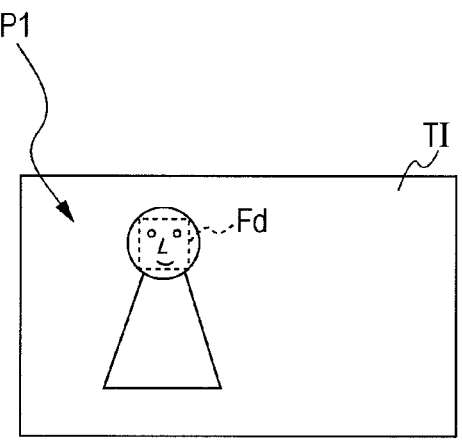
FIG. 4 is a diagram that schematically illustrates an example of the detection of a face area in a target image according to an embodiment of the invention.

FIG. 4 is a diagram that schematically illustrates an example of the result of face area detection performed in S300 of image correction processing according to the present embodiment of the invention. In the illustrated example of FIG. 4, since an image of a person P1 is included in the target image TI, a face area Fd corresponding to the face image of the person P1 is detected. The face area Fd is a rectangular area that includes an image part corresponding to eyes, a nose, and a mouth. The face area detection module 210 recognizes the area position of the face area Fd on the basis of the coordinates of four corners of the rectangular area. If the target image includes more than one face image, the face area detection module 210 detects a face area for each of the plurality of face images. Though it is assumed in the above description that the face area detection module 210 performs face area detection, it is not always the case. Information on the result of detection of a face area Fd in a target image is sometimes pre-attached to image data representing the target image stored in a memory card MC. That is, in some cases, information that defines the area position of the face area Fd in the target image is stored as accompanying information in the memory card MC. For example, some digital still cameras have a face area detection function. Information on the result of detection of a face area Fd in a target image is recorded in a memory card MC as adjunct information together with image data when a digital still camera that was used for photographing a person to acquire the target image has detected the face area Fd in advance as a function thereof. In such a case, it is not necessary for the face area detection module 210 to detect the face area Fd in the target image. That is, in such a case, the face area detection module 210 can locate the area position of the face area Fd in the target image by making reference to, and on the basis of, the pre-detection accompanying information.

In S400, the deformation direction setting module 220 sets a deformation direction for one-direction deformation processing. In the following description of this specification, if the term "deformation direction" is used as a simple unmodified term, it means a deformation direction for one-direction deformation processing unless otherwise specified. A deformation direction described in this specification corresponds to, as a non-limiting example thereof, a specific direction recited in appended claims. The deformation direction is either the horizontal direction of a target image or the vertical direction thereof. In the present embodiment of the invention, the direction of the long sides of a target image is defined as the horizontal direction, whereas the direction of the short sides of the target image is defined as the vertical direction. The deformation direction setting module 220 may set the deformation direction in accordance with an input made by a user from the outside. Or, the deformation direction setting module 220 may set the deformation direction on the basis of a result of the analysis of a target image.

When the deformation direction is set in accordance with an input made by a user from the outside, the deformation direction setting module 220 issues an instruction to the display processing block 310 so that a UI for making deformation direction setting should be displayed. In response to the instruction given from the deformation direction setting module 220, the display processing block 310 causes the display unit 150 to display a deformation direction setting UI. The user selects either "horizontal direction" or "vertical direction" as the deformation direction. The user inputs one direction via the deformation direction setting UI as they desire. The deformation direction setting module 220 sets either "horizontal direction" or "vertical direction" as the deformation direction in accordance with the selection input made by the user. Herein, while monitoring a target image displayed on the display unit 150, the user basically selects, as the deformation direction, either one of the horizontal direction of the target image and the vertical direction thereof that forms a smaller angle with respect to the horizontal direction of a face included in the target image, that is, with respect to the direction of the width of the face included in the target image than that of the other.

When the deformation direction is set on the basis of the result of the analysis of the target image, the deformation direction setting module 220 sets either the horizontal direction of the target image or the vertical direction thereof as the deformation direction depending on the tilt of the face included in the target image. For example, the deformation direction setting module 220 detects an area that includes an image part of the left eye and an area that includes an image part of the right eye inside the face area Fd that was detected by the face area detection module 210 or located thereby on the basis of accompanying information that defines the area position thereof in S300. The area that includes the image part of the left eye is hereafter referred to as "left eye area". The area that includes the image part of the right eye is hereafter referred to as "right eye area". The deformation direction setting module 220 can detect the eye areas, that is, the left eye area and the right eye area, by means of a known detection method, for example, a pattern matching method that utilizes a template just in the same manner as done for the detection of the face area Fd explained above.

Figure 5:
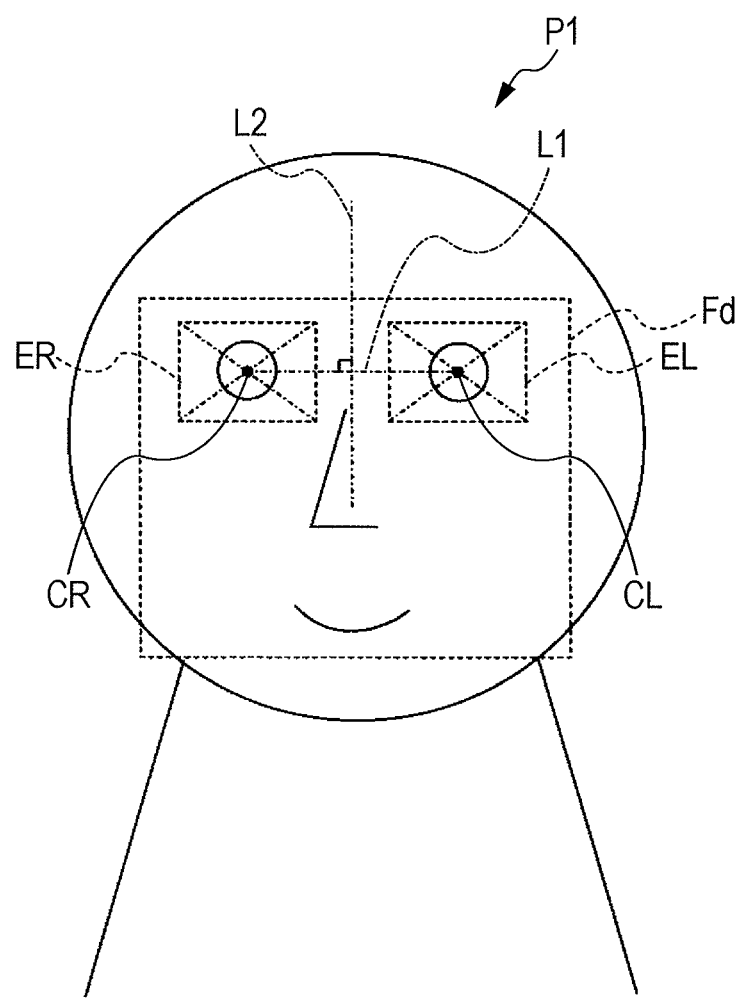
FIG. 5 is a diagram that schematically illustrates an example of the detection of a face organ area in a face area according to an embodiment of the invention.

FIG. 5 is a diagram that schematically illustrates an example of the result of face-part area detection, or more specifically, eye-area detection in image correction processing according to the present embodiment of the invention. In the illustrated example of FIG. 5, a left eye area EL and a right eye area ER have been detected in the face area Fd. Each of the left eye area EL and the right eye area ER detected by the deformation direction setting module 220 is a rectangular area. The deformation direction setting module 220 can recognize the area position of each of the left eye area EL and the right eye area ER on the basis of the coordinates of four corners thereof. As illustrated therein, a line segment L1 extends from the center CR of the right eye area ER to the center CL of the left eye area EL. Another line segment L2 extends in perpendicular to the line segment L1 inside the target image TI. The deformation direction setting module 220 regards the line segment L2 as one that represents the vertical direction of the face, that is, the direction of the height of the face. The deformation direction setting module 220 further regards the inclination of the line segment L2 as the tilt of the face. For example, in a case where the inclination of the line segment L2 with respect to the vertical direction of the target image TI is smaller than an angle of 45°, the deformation direction setting module 220 sets the deformation direction into the "horizontal direction". On the other hand, in a case where the inclination of the line segment L2 with respect to the vertical direction of the target image TI is larger than 45°, the deformation direction setting module 220 sets the deformation direction into the "vertical direction". If the inclination of the line segment L2 with respect to the vertical direction of the target image TI is equal to 45°, the deformation direction setting module 220 sets the deformation direction into a standard direction that has been determined in advance, for example, the horizontal direction.

When the target image TI includes a plurality of faces, the deformation direction setting module 220 may set the deformation direction on the basis of the tilt of one face that has a larger or the largest inclination with respect to either the vertical direction of the target image TI or the horizontal direction thereof. Or, when the target image TI includes a plurality of faces, the deformation direction setting module 220 may set the deformation direction on the basis of the tilt of one face that has a smaller or the smallest inclination with respect to either the vertical direction of the target image TI or the horizontal direction thereof. As another example, when the target image TI includes a plurality of faces, the deformation direction setting module 220 may set the deformation direction on the basis of the tilt of the plurality of faces. In the following description of this specification, it is assumed that the deformation direction setting module 220 sets the horizontal direction as the deformation direction. The explanation is continued on the basis of such an assumption.

In S500, the face deformation module 240 judges whether the deformation direction set in the preceding step S400 is approximately orthogonal to the direction of the height of the face or not. If it is judged that the deformation direction is approximately orthogonal to the height direction of the face (S500: YES), the process proceeds to S600. If it is judged that the deformation direction is not approximately orthogonal to the height direction of the face (S500: NO), the process jumps to S700 while skipping S600. Herein, it is judged that the deformation direction is approximately orthogonal to the height direction of the face not only in a case where an angle formed by a virtual line extending in the deformation direction and the line segment L2 is exactly 90° but also in a case where the angle formed by the virtual line extending in the deformation direction and the line segment L2 falls within some angular range whose center is 90°, which means that a predetermined small margin is tolerated. For example, the deformation direction is judged to be approximately orthogonal to the height direction of the face when the angle is 90±5°. For the purpose of making the judgment of S500, the image correction processing block 200 finds the line segment L2 that represents the height direction of the face on the basis of the detection of the face-organ area (e.g., eye area) as explained above even when the deformation direction was set in accordance with the input made by the user in S400.

The reason why the judgment of S500 is performed before S600, which might be skipped depending on the judgment result at S500, is as follows. In short, the sliming correction processing aims to avoid excessive slimming of a face. Specifically, in the face deformation processing of S600, face(s) included in a target image is expanded in the face-width direction in a deforming manner. Then, in the one-direction deformation processing of S700, the entire image of the person including the face thereof is compressed in the deformation direction in order to make the person look slim and slender while avoiding the "after-the-processing" face from looking elongated, which is strange or unnatural. Though the sliming correction processing aims to produce such desirable correction effects, if the deformation direction is not approximately orthogonal to the direction of the height of the face, the compression processing performed in S700 does not work properly to offset the effects of the expansion of the face in the face-width direction performed in S600. In such a case, since the compression processing performed in S700 does not produce intended offsetting effects, a problem arises in that the face expanded in S600 does not contract properly. In addition, if the deformation direction is not approximately orthogonal to the direction of the height of the face, as a result of the expansion of the face in the face-width direction in S600 and the compression of the entire image of the person including the face thereof in the deformation direction in S700, there is a possibility that the face after the processing looks more obese than the original face. In order to avoid such undesirable effects, in the processing flow of image correction processing according to the present embodiment of the invention, S600 is executed only when it is judged in S500 that the deformation direction is approximately orthogonal to the height direction of the face. By this means, it is possible to ensure that undesirable correction is not performed against the aim of the sliming correction processing. In S600, the face deformation module 240 performs face deformation processing on face image(s) included in the target image TI.

Figure 6:
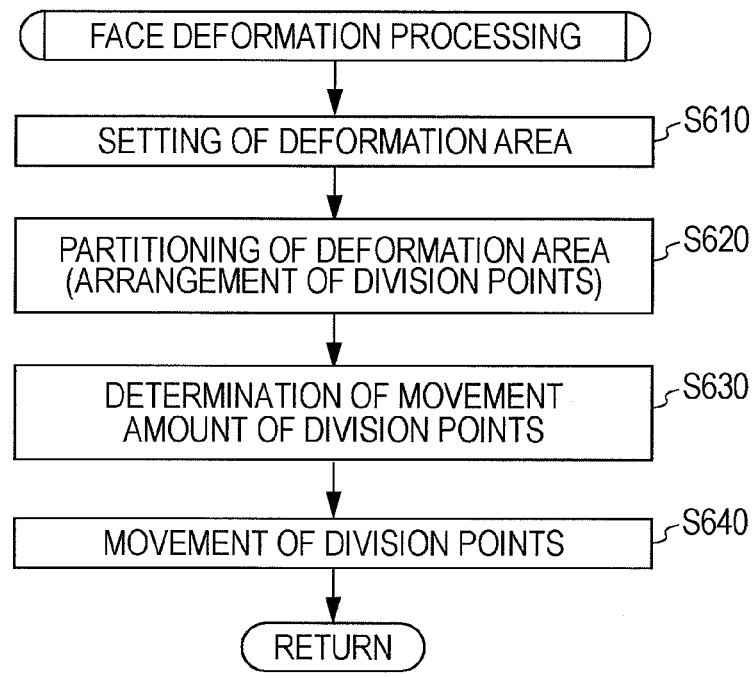
FIG. 6 is a flowchart that schematically illustrates an example of face deformation processing according to an embodiment of the invention.

FIG. 6 is a flowchart that schematically illustrates an example of face deformation processing performed in S600 of image correction processing according to the present embodiment of the invention. In S610, the face deformation module 240 sets a deformation target area on the basis of the face area Fd that was detected by the face area detection module 210 or located thereby on the basis of accompanying information that defines the area position thereof as explained earlier. The deformation target area is an area on which face deformation processing is performed. The deformation target area includes the face area Fd inside the target image TI. The deformation target area is a rectangular area that covers almost the entire area of a face image. Accordingly, the deformation target area may be roughly interpreted as a face image area. The deformation target area may be hereafter referred to as "transformation area".

Figure 7:
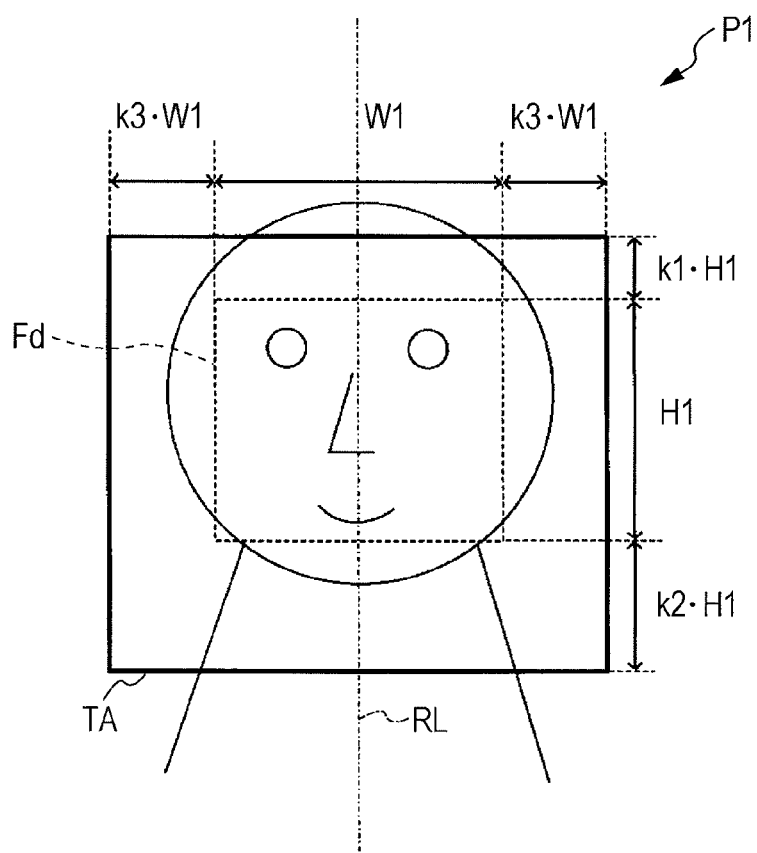
FIG. 7 is a diagram that schematically illustrates an example of the setting of a deformation area on the basis of a face area according to an embodiment of the invention.

FIG. 7 is a diagram that schematically illustrates an example of a deformation target area setting method according to the present embodiment of the invention. In FIG. 7, a rectangle shown by a solid line represents, as a deformation target area, a transformation area TA that is set on the basis of the face area Fd. A reference line is shown in FIG. 7. The reference line RL is a line that defines the direction of the height of the face area Fd. The reference line RL shows the horizontal center of the face area Fd when viewed in the width direction thereof. The reference line RL passes the barycenter (i.e., center of gravity) of the rectangular face area Fd. The reference line RL extends in parallel with two area-demarcating lines (i.e., edge lines) of the face area Fd that extend in the direction of the height of the face area Fd. In addition, it can be said that the reference line RL is a line that is substantially parallel to the line segment L2. Therefore, in the judgment of S500, the face deformation module 240 may judge whether the deformation direction is approximately orthogonal to the reference line RL or not instead of judging whether the deformation direction is approximately orthogonal to the line segment L2 or not. The transformation area TA is set as an area determined by enlarging the face area Fd both in the direction parallel to the reference line RL, that is, in the face-area height direction, and in the direction perpendicular to the reference line RL, that is, in the face-area width direction. Specifically, the transformation area TA is set as follows. Let the height of the face area Fd be H1. Let the width of the face area Fd be W1. The value of the upper extension part of the transformation area TA viewed in the direction of the height of the face area Fd is calculated as k1×H1. The value of the lower extension part of the transformation area TA viewed in the direction of the height of the face area Fd is calculated as k2×H1. The value of each of the left extension part of the transformation area TA and the right extension part thereof viewed in the direction of the width of the face area Fd is calculated as k3×W1. These extension values are added to the height H of the face area Fd and the width W thereof respectively so as to determine the transformation area TA. Herein, k1, k2, and k3 are predetermined coefficients. When the transformation area TA is set as explained above, the reference line RL, which extends in parallel with the two edge lines of the face area Fd that extend in the height direction thereof, constitutes a line that extends in parallel with two edge lines of the transformation area TA that extend in the direction of the height of the transformation area TA. In addition, the reference line RL extends in such a manner that the line bisects the transformation area TA when viewed in the width direction thereof.

As illustrated in FIG. 7, the transformation area TA is set as an area that roughly covers an image part from the forehead of the person P1 to the chin thereof when viewed in the height direction and from the left cheek thereof to the right cheek thereof when viewed in the width direction. That is, in the image correction processing according to the present embodiment of the invention, these coefficients k1, k2, and k3 have been set in advance at such experimentally-found values that ensures that the transformation area TA roughly covers the forehead image-part area, the chin image-part area, the left cheek image-part area, and the right cheek image-part area. In S620, the face deformation module 240 divides the transformation area TA into a plurality of sub areas.

Figure 8:
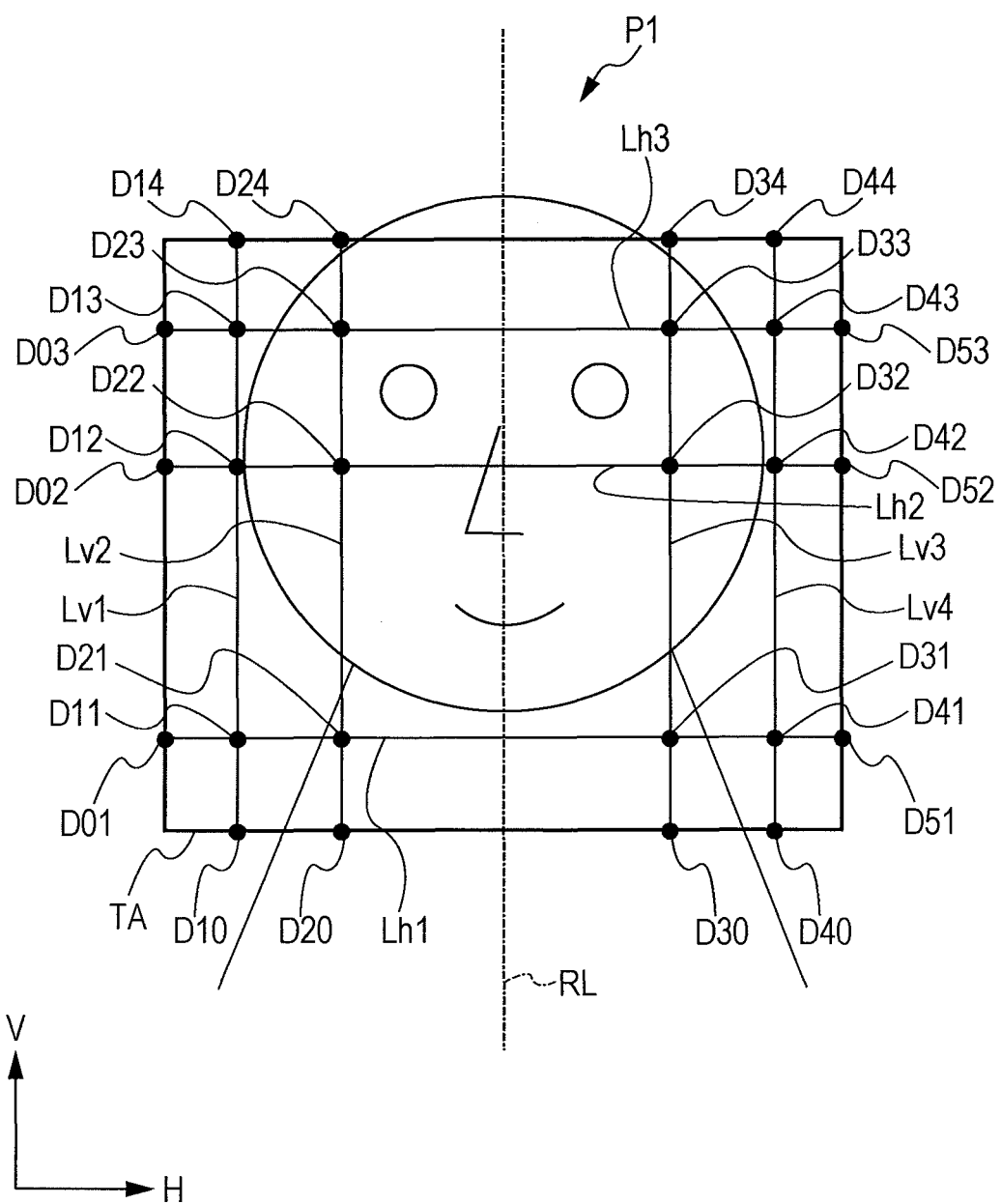
FIG. 8 is a diagram that schematically illustrates an example of a method for dividing a deformation area into a plurality of sub areas according to an embodiment of the invention.

FIG. 8 is a diagram that schematically illustrates an example of a method for dividing a transformation area into a plurality of sub areas. FIG. 8 shows the transformation area TA. The face deformation module 240 arranges a plurality of division points D on the transformation area TA. The face deformation module 240 divides the transformation area TA into a plurality of sub areas by means of lines that connect these division points D. How these division points D should be arranged, or more specifically, the number of the division points D and the layout positions thereof, is pre-defined in the division point arrangement pattern table 420. The face deformation module 240 looks up the division point arrangement pattern table 420 and arranges the division points D. In the illustrated example of FIG. 8, the division points D are arranged at intersections of horizontal division lines Lh and vertical division lines Lv, intersections of the horizontal division lines Lh and a frame of the transformation area TA, that is, the two edge lines of the transformation area TA that extend in the height direction thereof, and intersections of the vertical division lines Lv and the frame of the transformation area TA, that is, the two edge lines of the transformation area TA that extend in the width direction thereof. The horizontal division lines Lh and the vertical division lines Lv are lines that are used as reference for arranging the division points D in the transformation area TA. As illustrated in FIG. 8, in the arrangement of the division points D according to the present embodiment of the invention, three horizontal division lines Lh each of which extends in a direction perpendicular to the extending direction of the reference line RL and four vertical division lines Lv each of which extends in a direction parallel to the extending direction of the reference line RL are drawn. When viewed from the lower part of the transformation area TA toward the upper part thereof, these three horizontal division lines Lh are denoted as Lh1, Lh2, and Lh3 in the order of appearance herein. When viewed from the left part of the transformation area TA toward the right part thereof on the sheet of the drawing, these four vertical division lines Lv are denoted as Lv1, Lv2, Lv3, and Lv4 in the order of appearance herein.

The horizontal division line Lh1 extends below the image part of the chin in the transformation area TA. The horizontal division line Lh2 extends below the image part of the eyes in the transformation area TA. The horizontal division line Lh3 extends above the image part of the eyes or through the image part of the forehead in the transformation area TA. The vertical division line Lv1 extends outside the contour of the cheek in the transformation area TA. The vertical division line Lv4 also extends outside the face line (i.e., cheek line) in the transformation area TA. The vertical division line Lv2 extends outside the tail of the eye in the transformation area TA. The vertical division line Lv3 also extends outside the outer corner of the eye in the transformation area TA. The line positions of the horizontal division lines Lh and the vertical division lines Lv are determined in preset relation to the area size of the transformation area TA so that they are arrayed as explained in this paragraph.

In accordance with the line positions of the horizontal division lines Lh and the vertical division lines Lv determined as explained above, the division points D are arranged at the intersections of the horizontal division lines Lh and the vertical division lines Lv, the intersections of the horizontal division lines Lh and the frame of the transformation area TA, and the intersections of the vertical division lines Lv and the frame of the transformation area TA. As illustrated in FIG. 8, the division points D that are aligned on a certain horizontal division line Lhi (where i=any of 1, 2, and 3) are denoted as D0$i$, D1$i$, D2$i$, D3$i$, D4$i$, and D5$i$ in the order of appearance herein when viewed from the left to the right on the sheet of the drawing. For example, the division points D that are aligned on the horizontal division line Lh1 are denoted as D01, D11, D21, D31, D41, and D51, where the division point D01 is the leftmost one. In like manner, the division points D that are aligned on a certain vertical division line Lvj (where j=any of 1, 2, 3, and 4) are denoted as Dj0, Dj1, Dj2, Dj3, and Dj4 in the order of appearance herein when viewed from the bottom to the top. For example, the division points D that are aligned on the vertical division line Lv1 are denoted as D10, D11, D12, D13, and D14, where the division point D10 is the lowermost one. It should be noted that the arrangement of the division points D in the transformation area division according to the present embodiment of the invention is bilaterally symmetric with respect to the reference line RL. The face deformation module 240 divides the transformation area TA into the plurality of sub areas by means of the lines that connect these division points D, that is, by using the horizontal division lines Lh and the vertical division lines Lv as sub-area demarcating lines. In the illustrated example of FIG. 8, the transformation area TA is divided into twenty rectangular sub areas.

In S630, the face deformation module 240 determines the amount of movement of given division points D, that is, the amount of displacement thereof, on the basis of a compression rate that will be used in subsequent one-direction deformation processing. In the one-direction deformation processing of S700, which will be explained in detail later, in short, the following processing is performed. Partition lines, for example, two lines, are drawn on the target image TI so as to divide the image into image parts, for example, three image parts. The partition lines extend in a direction perpendicular to the deformation direction. The partition lines are not the same as the horizontal division lines Lh or the vertical division lines Lv. The area of the target image TI is partitioned into a compression area and expansion areas by the partition lines. The part of the target image TI in the compression area is compressed at a predetermined compression rate through the one-direction deformation processing whereas the parts of the target image TI in the expansion areas are expanded at a predetermined expansion rate through the one-direction deformation processing. The partitioning of the area of the target image TI into the compression area and the expansion areas by means of the partition lines, which extend in the direction perpendicular to the deformation direction, is performed in such a manner that the entire transformation area TA should be included in the expansion area. In S630, after the acquisition of such a compression rate that will be applied to the compression area in the one-direction deformation processing, the amount of the movement of the division points D are determined on the basis of the compression rate. In the following description of this specification, if the term "compression rate" is used as a simple unmodified term, it means the compression rate that will be applied to the compression area in the one-direction deformation processing unless otherwise specified. In like manner, in the following description of this specification, if the term "expansion rate" is used as a simple unmodified term, it means the expansion rate that will be applied to the expansion areas in the one-direction deformation processing unless otherwise specified.

The compression rate and the expansion rate may be pre-stored in the internal memory 120 or the like as fixed values. Or, a user may input values for the compression rate and the expansion rate through the manipulation of the operation unit 140. When the compression rate and the expansion rate are set on the basis of values inputted by a user, the printer 100 instructs the display processing block 310 to perform processing for displaying an UI for setting the compression rate and the expansion rate. The display processing block 310 causes the display unit 150 to display the UI for setting the compression rate and the expansion rate. Then, the user inputs desired values for the compression rate and the expansion rate via the compression/expansion rate setting UI. As a modification example of the above, in order to avoid any excessive change in the size of the target image TI after the one-direction deformation processing, the printer 100 may prompt the user to input not both but one of a compression-rate value and an expansion-rate value. The value of the other of the compression rate and the expansion rate is determined on the basis of the inputted one of the compression-rate value and the expansion-rate value.

As explained above, the face deformation module 240 can acquire the fixed compression-rate value that has been stored in the internal memory 120 in advance or the value inputted by the user for setting the compression rate. Or, the face deformation module 240 can acquire, as explained above, the compression-rate value as the value of the other of these two rates that is determined on the basis of the user-inputted one. In the following description of this specification, it is assumed that the face deformation module 240 has now acquired the value "30%" as the compression rate. The explanation is continued on the basis of such an assumption. Let the length of the compression area before the one-direction deformation processing when viewed in the deformation direction be "1"; then, the compression-rate value of "30%" means, in other words, a scaling factor that converts the length of the compression area before the one-direction deformation processing when viewed in the deformation direction into "0.7" after the one-direction deformation processing.

In the execution of the face deformation processing of the sliming correction processing, the face deformation module 240 sets the amount of movement of given division points D in an orientation away from the reference line RL, or more exactly, in a set of two directions opposite to each other away from the reference line RL, in order that at least a part of a face image should be expanded in the deformation direction. In the face deformation processing according to the present embodiment of the invention, the face deformation module 240 sets the amount of movement for inner division points D that are not on the frame of the transformation area TA among all division points D. Specifically, the face deformation module 240 sets the amount of movement for the division points D11, D12, D13, D21, D22, D23, D31, D32, D33, D41, D42, and D43. As illustrated in FIG. 8, the direction perpendicular to the extending direction of the reference line RL is referred to as "H direction". The direction parallel to the extending direction of the reference line RL is referred to as "V direction". Regarding the movement of the division points D in the H direction, the amount of movement to the right on the sheet of the drawing is expressed as a positive value (i.e., plus), whereas the amount of movement to the left on the sheet of the drawing is expressed as a negative value (i.e., minus). As for the V direction, the amount of upward movement is expressed as a positive value, whereas the amount of downward movement is expressed as a negative value.

As explained earlier, the face deformation processing of S600 is performed only in a case where it is judged in S500 that the deformation direction is approximately orthogonal to the direction of the height of the face. That is, S600 is performed only when it is judged that the deformation direction is approximately orthogonal to the line segment L2 or the reference line RL. Therefore, it can be said that the deformation direction is approximately parallel to the H direction. Therefore, as a result of setting the amount of movement of given division points D in an orientation away from the reference line RL and moving the division points D in accordance with the set movement amount, at least a part of a face image is expanded in the H direction, that is, roughly speaking, in the deformation direction. As an example of the movement amount setting, the face deformation module 240 sets negative H values, which indicates leftward movement in the H direction, for the division points D11, D21, D12, D22, D13, and D23, all of which are located at the left side when viewed from the reference line RL on the sheet of the drawing as inner division points. The face deformation module 240 sets positive H values, which indicate rightward movement in the H direction, for the division points D31, D41, D32, D42, D33, and D43, all of which are located at the right side when viewed from the reference line RL on the sheet of the drawing as inner division points.

The face deformation module 240 sets positive V values, which indicates upward movement in the V direction, for the division points D11, D21, D31, and D41, all of which are located on the horizontal division line Lh1 as inner division points. The face deformation module 240 sets negative V values, which indicate downward movement in the V direction, for the division points D13, D23, D33, and D43, all of which are located on the horizontal division line Lh3 as inner division points. It can be said that the deformation direction is approximately perpendicular to the V direction. Therefore, as a result of setting the amount of movement of the inner division points D that are aligned on the horizontal division line Lh1 and the inner division points D that are aligned on the horizontal division line Lh3 and moving these division points D in accordance with the set movement amount, at least a part of a face image is compressed in the V direction and thus in the direction orthogonal to the deformation direction.

More specifically, when setting the amount of movement of each inner division point D, the face deformation module 240 separates the value of the compression rate, which is assumed to be 30% here, into the amount of deformation of the image in the transformation area TA in the H direction, that is, the amount of expansion thereof in the H direction, and the amount of deformation of the image in the transformation area TA in the V direction, that is, the amount of compression thereof in the V direction, in accordance with a predetermined allocation percentage (i.e., ratio). For example, the face deformation module 240 allocates 80% of the value of the compression rate to the amount of deformation (i.e., expansion) of the image in the H direction. Since the value of the compression rate is assumed to be 30% here, 24% (30%×0.8) is allocated to the amount of deformation of the image in the H direction. Then, after the subtraction of the percentage value allocated to the amount of deformation of the image in the H direction from the original value of the compression rate, the face deformation module 240 allocates the remaining value to the amount of deformation (i.e., compression) of the image in the V direction. In this example, 6% (30%−24%) is allocated to the amount of deformation of the image in the V direction.

The face deformation module 240 further separates the percentage value allocated to the amount of deformation of the image in the H direction and the percentage value allocated to the amount of deformation of the image in the V direction and then sub-allocates the separated values to the respective division points D as the amount of movement. For example, the face deformation module 240 sets a half of the percentage value allocated to the amount of deformation of the image in the H direction, which is 24% in this example, as the amount of movement of the division points D11, D12, D13, D21, D22, D23, D31, D32, D33, D41, D42, and D43 in the H direction. Therefore, 12% is set as the amount of movement of each of these inner division points D1-D43 in an orientation away from the reference line RL. On the other hand, the face deformation module 240 sets a quarter of the percentage value allocated to the amount of deformation of the image in the V direction, which is 6% in this example, as the amount of movement of each of the division points D11, D21, D31, and D41, all of which are located on the horizontal division line Lh1 as inner division points, in the positive V direction. Therefore, 1.5% is set as the amount of upward movement of each of these inner division points D11, D21, D31, and D41 located on the horizontal division line Lh1. In addition, the face deformation module 240 sets three quarters of the percentage value allocated to the amount of deformation of the image in the V direction, which is 6% in this example, as the amount of movement of each of the division points D13, D23, D33, and D43, all of which are located on the horizontal division line Lh3 as inner division points, in the negative V direction. Therefore, 4.5% is set as the amount of downward movement of each of these inner division points D13, D23, D33, and D43 located on the horizontal division line Lh3. As a consequence of the allocation explained above, for example, the value of 12% is set as the amount of movement of the division point D11 in the negative H direction; in addition, the value of 1.5% is set as the amount of movement thereof in the positive V direction. As for the division point D43, the value of 12% is set as the amount of movement in the positive H direction; in addition, the value of 4.5% is set as the amount of movement in the negative V direction. Each amount of movement of the division points D in the H direction and the V direction, which is set as explained above, means a percentage value relative to the length (i.e., the number of pixels) of the transformation area TA when viewed in the H direction and the length thereof when viewed in the H direction.

The allocation percentage explained above, which is used as a factor for separating the value of the compression rate into the amount of deformation in the H direction and the amount of deformation in the V direction, is not limited to a specific example described herein. The sub-allocation percentage used as a factor for further separating the percentage value allocated to the amount of deformation in the H direction and the percentage value allocated to the amount of deformation in the V direction so as to sub-allocate the separated values to the respective division points D as the amount of movement is not limited to a specific example described herein. Moreover, the face deformation module 240 may further change the amount of movement of the division points D in the H direction and the V direction on a point-by-point basis. Although various modifications are conceivable, in principle, the division points D should be moved in such a manner that they are bilaterally symmetric with respect to the reference line RL. In addition, in the face deformation processing of the sliming correction processing, the amount of movement of each of the division points D13, D23, D33, and D43, all of which are located on the horizontal division line Lh3 as inner division points, in the negative V direction is set to be larger than the amount of movement of each of the division points D11, D21, D31, and D41, all of which are located on the horizontal division line Lh1 as inner division points, in the positive V direction. The reason why the amount of movement of each of the division points D13, D23, D33, and D43 in the negative V direction is set to be larger than the amount of movement of each of the division points D11, D21, D31, and D41 in the positive V direction is to avoid the image part of the neck of the person P1 after the face deformation processing from looking unnaturally elongated, which would occur if the division points D11, D21, D31, and D41 located on the horizontal division line Lh1 were moved in the positive V direction excessively.

FIG. 9 is a table that shows an example of the amount of movement of the division points D in the H direction and the V direction. Specifically, the table shows an example of the movement amount determined as a result of separating, by the face deformation module 240, the value of the compression rate into the amount of deformation in the H direction and the amount of deformation in the V direction and further separating the percentage value allocated to the amount of deformation in the H direction and the percentage value allocated to the amount of deformation in the V direction so as to suballocate the separated values to the respective division points D. Note that FIG. 9 shows a result of applying some change to the movement amount of the division points D determined on the basis of the compression rate as explained above depending on the positions of the division points D. In FIG. 9, the movement amount of each division point D is expressed not as n % as explained above but as a corresponding pixel pitch value, that is, as a reduced value. For example, as for the division point D13, leftward movement amount in the H direction that is 19 times as large in terms of distance as a pixel pitch is set in the table; in addition, downward movement amount in the V direction that is 7 times as large in terms of distance as the pixel pitch is set therein. In the illustrated example of FIG. 9, the amount of movement in the V direction is set in the table not only for each of the division points D11, D21, D31, and D41 located on the horizontal division line Lh1 and each of the division points D13, D23, D33, and D43 located on the horizontal division line Lh3 but also for each of the division points D12, D22, D32, and D42 located on the horizontal division line Lh2. In S640, the face deformation module 240 moves each division point D in accordance with the movement amount determined for the division point D in S630. The face deformation module 240 deforms the plurality of sub areas in the transformation area TA as a result of the movement of the division points D. Since the plurality of sub areas becomes deformed in the transformation area TA, the image in the transformation area TA also becomes deformed.

Figure 10:
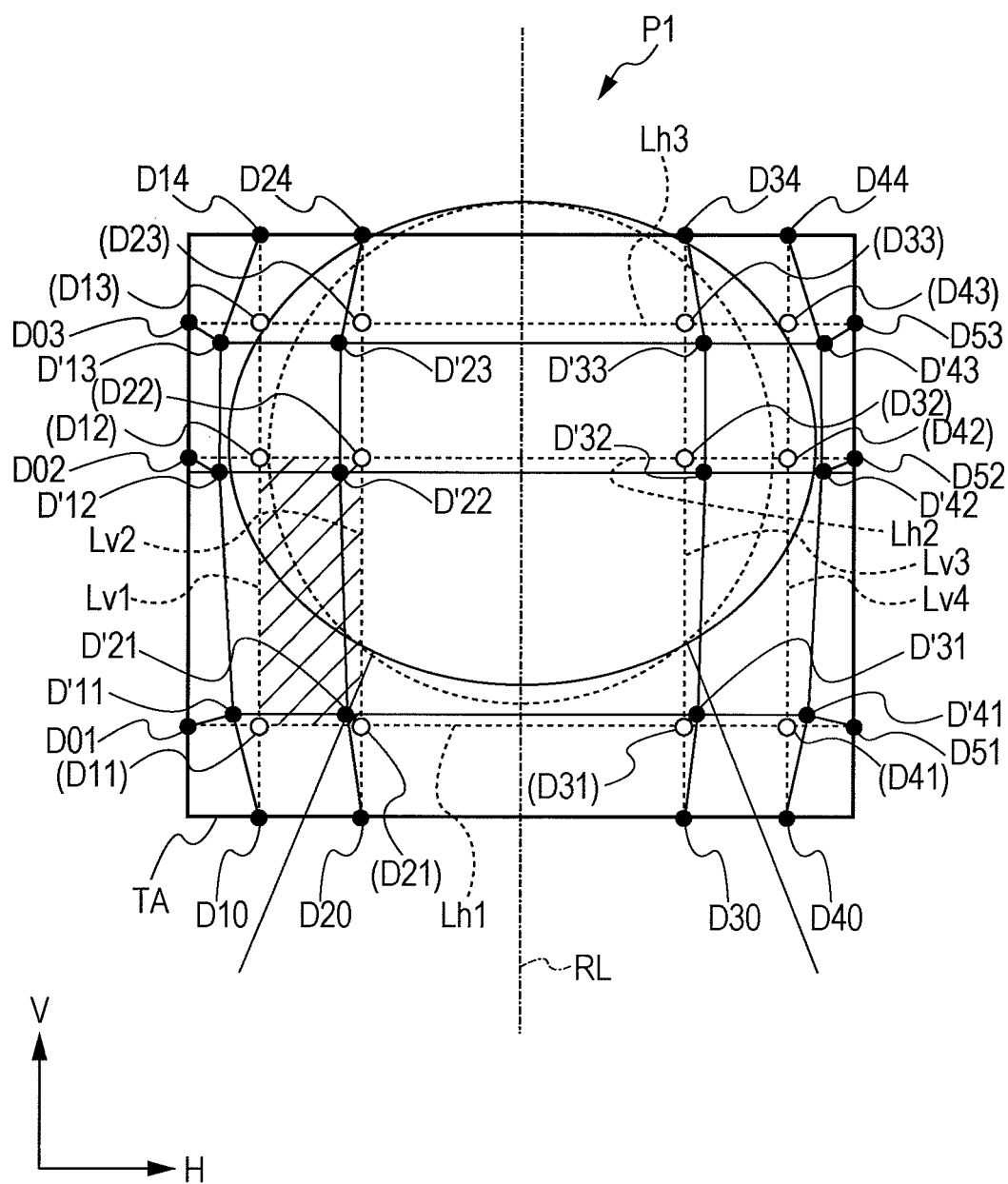
FIG. 10 is a diagram that schematically illustrates an example of the deformation of an image in a deformation area through face deformation processing according to an embodiment of the invention.

FIG. 10 is a diagram that schematically illustrates an example of the deformation of an image in the transformation area TA, which occurs as a result of the movement of each division point D in accordance with the movement amount determined for the division point D as illustrated in FIG. 9. The face deformation module 240 performs image deformation processing on each of the plurality of sub areas that make up the transformation area TA in such a manner that the image part of each sub area before the movement of the division points D becomes the image part of a newly-defined sub area after the movement of the division points D. For the purpose of comparative explanation, in FIG. 10, the contour of the face of the person P1 before deformation processing is shown by a broken line, whereas the contour of the face of the person P1 after deformation processing is indicated with a solid line. In addition, in FIG. 10, each division point after movement is denoted with an apostrophe, for example, as in D'11, whereas each division point before movement is denoted with a round bracket, for example, as in (D11). The positions of the division points before movement are shown as small open circles. The image part of the sub area having four corners at the division points D11, D21, D22, and D12, which is illustrated in the drawing as a hatched sub area, is deformed into the image part of the sub area having its vertices at the division points D'11, D'21, D'22, and D'12. A more detailed explanation of processing for deforming the image part of each sub area will be given later.

As illustrated in FIG. 10, as a result of the movement of the division points D in S640 in the direction parallel to the extending direction of the reference line RL, that is, in the V direction, the division points D11, D21, D31, and D41 located on the horizontal division line Lh1 are moved upward, whereas the division points D12, D22, D32, and D42 located on the horizontal division line Lh2 and the division points D13, D23, D33, and D43 located on the horizontal division line Lh3 are moved downward. Therefore, the image part between the horizontal division line Lh1 and the horizontal division line Lh3 are compressed in the V direction as a result of the movement of the division points D. Especially, the image part between the horizontal division line Lh1 and the horizontal division line Lh2 are compressed in the V direction with greater compression effects.

As a result of the movement of the division points D in S640 in the direction perpendicular to the extending direction of the reference line RL, that is, in the H direction, the division points D11, D12, and D13 located on the vertical division line Lv1 are moved to the left, whereas the division points D41, D42, and D43 located on the vertical division line Lv4 are moved to the right. In addition, the division points D21, D22, and D23 located on the vertical division line Lv2 are moved to the left, whereas the division points D31, D32, and D33 located on the vertical division line Lv3 are moved to the right. Therefore, the image part that is located to the left side of the vertical division line Lv1 is compressed leftward in the H direction. The image part that is located to the right side of the vertical division line Lv4 is compressed rightward in the H direction. In addition, the image part that is located between the vertical division line Lv1 and the vertical division line Lv2 is expanded while moving to the left in the H direction, whereas the image part that is located between the vertical division line Lv3 and the vertical division line Lv4 is expanded while moving to the right in the H direction. Moreover, the image part that is located between the vertical division line Lv2 and the vertical division line Lv3 is expanded in the H direction with the reference line RL defining the center thereof As explained earlier, the horizontal division line Lh1 extends below the image part of a chin. The horizontal division line Lh3 extends through the image part of a forehead or near the image part of the forehead. Each of the vertical division lines Lv1 and Lv4 extends outside the contour of the corresponding cheek. Each of the vertical division lines Lv2 and Lv3 extends outside the tail of the corresponding eye. Therefore, in the face deformation processing of the sliming correction processing according to the present embodiment of the invention, the part of the face image from the chin inclusive to the forehead inclusive is compressed in the V direction. In addition, the part of the face image from the left cheek inclusive to the right cheek inclusive is expanded in the H direction. As a brief summary of the deformation in the H direction and the V direction explained above, as a result of the processing of S640 that is executed when the sliming correction processing has been instructed (and if the result of the judgment made in S500 is YES), the face of the person P1 inside the transformation area TA is deformed in a contracting manner to some degree in the height direction and in an expanding manner to some degree, for example, as if it became obese, in the width direction.

In S630, the face deformation module 240 may multiply the calculated movement amount, that is, the movement amount determined as a result of separating the value of the compression rate into the amount of deformation in the H direction and the amount of deformation in the V direction and further separating the percentage value allocated to the amount of deformation in the H direction and the percentage value allocated to the amount of deformation in the V direction so as to sub-allocate the separated values to the respective division points D, by a predetermined correction coefficient. Then, the face deformation module 240 may take each value obtained as a result of the multiplication of the correction coefficient as the corrected movement amount of the corresponding division point D. Herein, the correction coefficient is, for example, any value that is not smaller than zero but smaller than one. The correction coefficient is a value that is used for correctively reducing the degree of expansion in the direction of the width of a face (i.e., H direction) and the degree of compression in the direction of the height of the face (i.e., V direction). The specific value of the correction coefficient may have been stored in the internal memory 120 in advance. Or, the correction efficient value may be set in accordance with an input made by a user. The reduction in the degree of deformation through the multiplication of the correction coefficient explained above is performed when, for example, there is a risk of degrading an image due to excessive amount of deformation if the movement amount that has been sub-allocated to each division point D on the basis of the compression rate as explained above is applied to the division point D without any correction.

Figure 11:
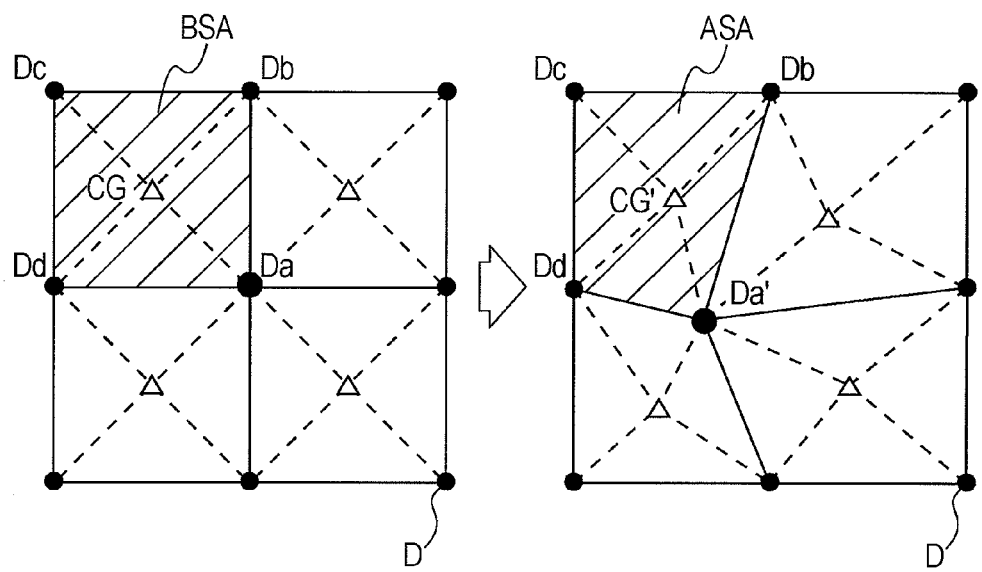
FIG. 11 is a concept diagram that schematically illustrates an example of the deformation of a sub-area image according to an embodiment of the invention.

FIG. 11 is a concept diagram that schematically illustrates an example of processing for deforming a sub-area image that is executed in S640 of the face deformation processing according to the present embodiment of the invention. In FIG. 11, each division point D is shown as a filled circle. In order to simplify explanation, four sub areas before the movement of the division points D are shown as the left part of FIG. 11, whereas four sub areas after the movement of the division points D are shown as the right part of FIG. 11. In the illustrated example of FIG. 11, a center division point Da is moved to the position of a division point Da'. Though it is described above as "the movement of the division points D", the positions of other division points D remain unchanged. As a result of deformation processing, for example, the image of a quadrangular sub area having its vertices at division points Da, Db, Dc, and Dd before the movement of the division points D is deformed into the image of a quadrangular sub area having its vertices at division points Da', Db, Dc, and Dd after the movement of the division points D. The quadrangular sub area before the movement of the division points D may be hereafter referred to as "before-the-deformation sub area of interest" BSA or more simply as "pre-deformation sub area" BSA. The quadrangular sub area after the movement of the division points D may be hereafter referred to as "after-the-deformation sub area of interest" ASA or more simply as "post-deformation sub area" ASA.

In the sub-area image deformation processing according to the present embodiment of the invention, a quadrangular sub area is divided into four triangular areas with the use of the center of gravity CG of the sub area. Then, image deformation processing is performed for each triangular area. In the illustrated example of FIG. 11, the pre-deformation sub area BSA is divided into four triangular areas each of which has a vertex at the center of gravity CG of the pre-deformation sub area BSA. In like manner, the post-deformation sub area ASA is divided into four triangular areas each of which has a vertex at the center of gravity CG of the post-deformation sub area ASA. Then, the image deformation processing is performed so as to deform each triangular area before the movement of the division point Da into the corresponding triangular area after the movement of the division point Da. For example, the image of the triangular area that has its vertices at the division points Da and Dd as well as at the center of gravity CG in the pre-deformation sub area BSA is deformed into the image of the triangular area that has its vertices at the division points Da' and Dd as well as at the center of gravity CG' in the post-deformation sub area ASA.

Figure 12:
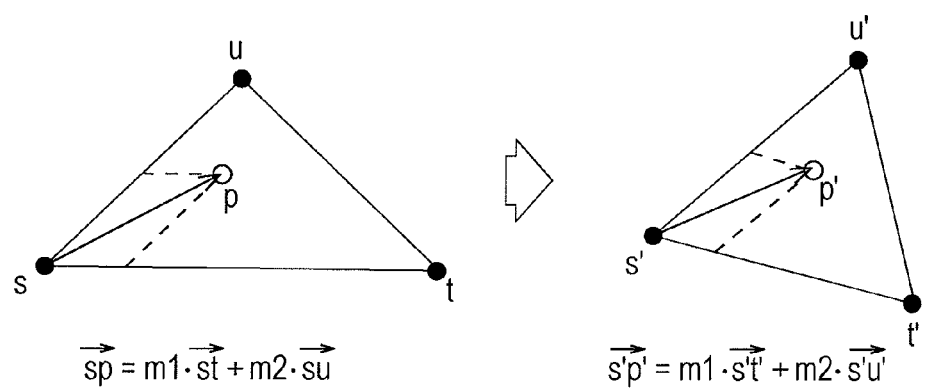
FIG. 12 is a concept diagram that schematically illustrates an example of a method for deforming an image in a triangular area according to an embodiment of the invention.

FIG. 12 is a concept diagram that schematically illustrates an example of a method for deforming an image in a triangular area according to the present embodiment of the invention. In the illustrated example of FIG. 12, an image in an area of a triangle stu having its vertices at points s, t, and u is deformed into an image in an area of a triangle s't'u' having its vertices at points s', t', and u'. The deformation of an image is performed as follows. As a first step, calculation is carried out in order to find a pixel position in the image in the triangular area stu before deformation that corresponds to the position of a certain pixel in the image in the triangular area s't'u' after deformation. Then, a pixel value at the position found through calculation in the image before deformation is taken as a pixel value in the image after deformation.

For example, in the illustrated example of FIG. 12, it is assumed that the position of a pixel of interest p' in the image in the triangular area s't'u' after deformation corresponds to a position p in the image in the triangular area stu before deformation. The calculation of the position p is carried out as follows. As a first step, coefficients m1 and m2 that mathematically express the position of the pixel of interest p' as the sum of a vector s't' and a vector s'u' as shown in the following equation (1) are calculated.

$$\overrightarrow{s'p'}=m1\cdot\overrightarrow{s't'}+m2\cdot\overrightarrow{s'u'} \quad (1)$$

Next, with the use of the calculated coefficients m1 and m2, the sum of a vector st and a vector su in the triangular area stu before deformation is calculated in accordance with the following equation (2). As a result, the position p is found.

$$\overrightarrow{sp}=m1\cdot\overrightarrow{st}+m2\cdot\overrightarrow{su} \quad (2)$$

If the position p in the triangular area stu before deformation agrees with the position of the center of a pixel in the image before deformation, the pixel value of this pixel is taken as a pixel value in the image after deformation. On the other hand, if the position p in the triangular area stu before deformation disagrees with the position of the center of a pixel in the image before deformation, a pixel value at the position p is calculated through interpolation computation, for example, by means of a bi-cubic convolution interpolation method utilizing pixel values of pixels around the position p. In such a case, the calculated pixel value is taken as a pixel value in the image after deformation.

A pixel value is calculated for each pixel in the image in the triangular area s't'u' after deformation as explained above. By this means, it is possible to deform the image in the triangular area stu into the image in the triangular area s't'u'. In this way, the face deformation module 240 defines triangular areas for each of sub areas that make up the transformation area TA and performs deformation processing on each sub area.

In S700, the one-direction deformation module 230 performs one-direction deformation processing on the target image TI. The one-direction deformation module 230 draws partition lines that extend in a direction orthogonal to the deformation direction so as to partition the area of the target image TI into a compression area and expansion areas.

Figure 13:
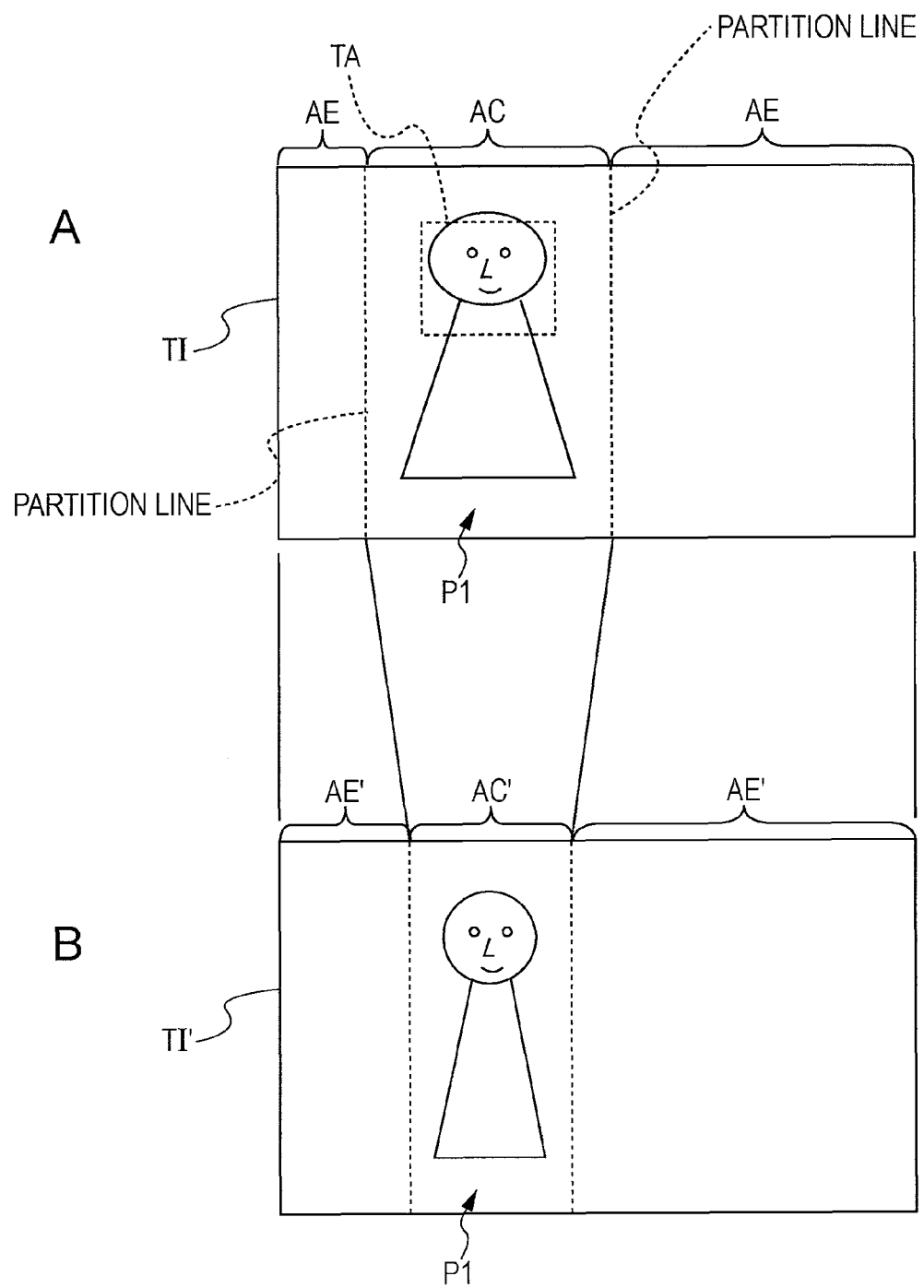
FIG. 13 is a diagram that schematically illustrates an example of the deformation of the areas of a target image according to an embodiment of the invention.

The part A of FIG. 13 illustrates an example of the division of the area of the target image TI into a compression area AC and expansion areas AE. The part B of FIG. 13 illustrates an example of a result of applying the one-direction deformation processing to the target image TI. The image obtained as a result of applying the one-direction deformation processing to the target image TI may be hereafter referred to as "one-direction-deformed image TI'" or more simply as "deformed image TI'", which means an image that has been subjected to the one-direction deformation processing. The one-direction deformation module 230 sets the compression area AC as follows. The one-direction deformation module 230 determines the width of the compression area AC as viewed in the deformation direction on the basis of the width of the transformation area TA as viewed in the deformation direction. For example, the one-direction deformation module 230 sets a value obtained by multiplying the width of the transformation area TA as viewed in the deformation direction by 2.5 as the width of the compression area AC as viewed in the deformation direction. The one-direction deformation module 230 draws two partition lines each of which extends in a direction orthogonal to the deformation direction in such a manner that the partition lines demarcate an area that has the determined width and includes the transformation area TA. Basically, the center of the area demarcated by the partition lines coincides with the center of the transformation area TA. The one-direction deformation module 230 sets the demarcated area as the compression area AC. Therefore, in principle, the compression area AC includes the entire image of the person P1 in the target image TI.

The one-direction deformation module 230 sets remaining areas of the target image TI, that is, areas other than the compression area AC, as the expansion areas AE. Then, the one-direction deformation module 230 performs the one-direction deformation processing. As a result, as illustrated in the part B of FIG. 13, the image part of the compression area AC in the target image TI is deformed into the image part of the compression area AC' in the deformed image TI'. The compression area AC' has a smaller width than that of the compression area AC as viewed in the deformation direction as a result of compression. In addition, the image part of each expansion area AE in the target image TI is deformed into the image part of the corresponding expansion area AE' in the deformed image TI'. The expansion area AE' has a larger width than that of the expansion area AE as viewed in the deformation direction as a result of expansion.

Figure 14:
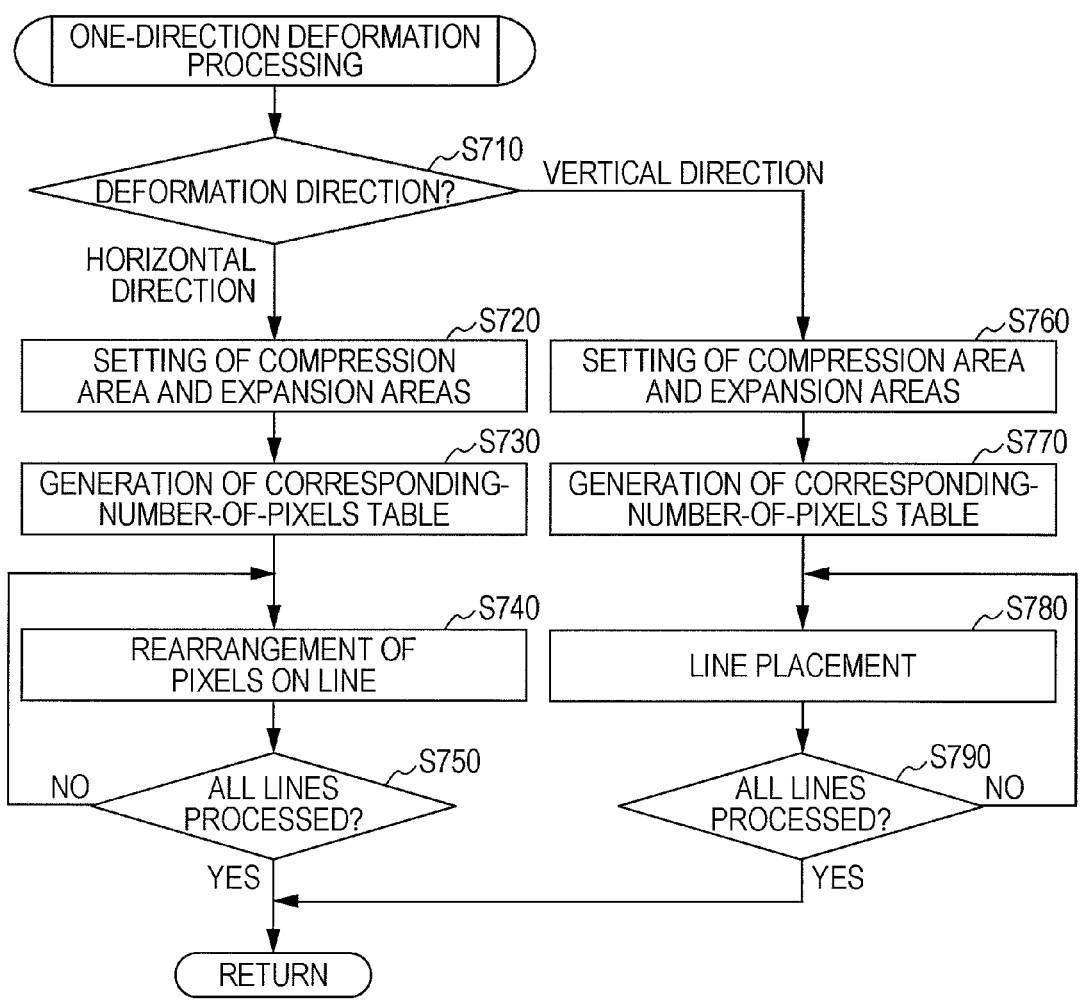
FIG. 14 is a flowchart that schematically illustrates an example of one-direction deformation processing according to an embodiment of the invention.

FIG. 14 is a flowchart that schematically illustrates an example of one-direction deformation processing performed in S700 of image correction processing according to the present embodiment of the invention. FIG. 15 is a diagram that schematically illustrates an example of one-direction deformation processing according to the present embodiment of the invention, where the deformation direction is assumed to be the horizontal direction. FIG. 15A illustrates an example of the arrangement of pixels in a target image before one-direction deformation processing. FIG. 15B illustrates an example of the corresponding-number-of-pixels table 410. FIG. 15C illustrates an example of the arrangement of pixels in an image that has been subjected to one-direction deformation processing, that is, a deformed image.

In S710, the one-direction deformation module 230 judges which one of the two directions, that is, either the horizontal direction or the vertical direction, was set by the deformation direction setting module 220 as the deformation direction in S400. If the deformation direction is the horizontal direction, the process proceeds to S720. If the deformation direction is the vertical direction, the process proceeds to S760. As explained earlier, it is assumed in the present embodiment of the invention that the deformation direction setting module 220 set the horizontal direction as the deformation direction. Therefore, the process proceeds to S720. In S720, the one-direction deformation module 230 sets a compression area and expansion areas by dividing the area of a target image. Since an explanation as to how the compression area and the expansion areas are set has already been given above, no further explanation is given here.

In S730, the one-direction deformation module 230 generates the corresponding-number-of-pixels table 410. The corresponding-number-of-pixels table 410 is a table that shows the number of pixel(s) in a deformed image for each pixel of a target image in the deformation direction. The one-direction deformation module 230 determines the number of pixels in the deformed image (i.e., the corresponding number of pixels) on the basis of a scaling factor that has already been set for each of the compression area and the expansion area (i.e., a compression rate and an expansion rate). Then, the one-direction deformation module 230 stores the corresponding number of pixels determined as explained above into a table so as to generate the corresponding-number-of-pixels table 410.

When generating the corresponding-number-of-pixels table 410, the one-direction deformation module 230 converts a compression rate and an expansion rate into a scaling factor. For example, if the value of 30% is set as the compression rate as explained earlier, the compression rate is converted into the scaling factor of ×0.7. If the value of 30% is set as the expansion rate, the expansion rate is converted into the scaling factor of ×1.3. For example, the one-direction deformation module 230 performs binarization through halftone processing on the decimal part of the scaling factor so as to determine the array pattern of 0 and 1. The one-direction deformation module 230 then adds the integer part of the scaling factor to the value of 0 or 1 in the array pattern. By this means, it is possible to determine the corresponding number of pixels for each pixel of the target image. When generating the corresponding-number-of-pixels table 410, the one-direction deformation module 230 can use a well-known method such as a dithering method, an error diffusion method, or the like, for halftone processing. Or, a pre-stored array pattern for each decimal part of a scaling factor may be used. In S730, a corresponding-number-of-pixels table that has been prepared in advance may be used instead of generating the corresponding-number-of-pixels table 410.

In order to simplify explanation, in the illustrated example of FIG. 15A, it is assumed that pixels before one-direction deformation are arrayed in areas 1, 2, and 3 each of which is made up of five pixels aligned in the horizontal direction of an image. Each of the areas 1 and 3 is assumed to be an expansion area, whereas the area 2 is assumed to be a compression area. Herein, it is further assumed that the scaling factors of the areas 1, 2, and 3 are ×1.2, ×0.6, and ×1.2, respectively. Accordingly, as illustrated in FIG. 15B, the corresponding number of pixels for each of four pixels Px1, Px2, Px3, and Px5 among the five pixels of the area 1 is set as one in the corresponding-number-of-pixels table, whereas the corresponding number of pixels for the remaining one pixel Px4 is set as two therein. The corresponding number of pixels for each of three pixels Px6, Px8, and Px10 among the five pixels of the area 2 is set as one in the corresponding-number-of-pixels table, whereas the corresponding number of pixels for each of the remaining two pixels Px7 and Px9 is set as zero therein. The corresponding number of pixels for each of four pixels Px11, Px12, Px13, and Px15 among the five pixels of the area 3 is set as one in the corresponding-number-of-pixels table, whereas the corresponding number of pixels for the remaining one pixel Px14 is set as two therein.

In S740, the one-direction deformation module 230 rearranges pixels on one line of the target image with the use of a buffer space in the internal memory 120 while looking up the corresponding-number-of-pixels table. Herein, the line is a processing target unit in one-direction deformation. The line is an image area whose length corresponds to all pixels in the horizontal direction of a target image. The width of the image area corresponds to one pixel. In the illustrated example of FIG. 15, the pixels are re-arranged as illustrated in FIG. 15C. Specifically, as pixels that make up the area 1, one pixel is sequential placed for Px1, Px2, and Px3, all of which has the value 1 as the corresponding number of pixels, followed by the placement of two pixels for Px4, which has the value 2 as the corresponding number of pixels and the subsequent placement of one pixel for Px5, which has the value 1 as the corresponding number of pixels. Next, as pixels that make up the area 2, one pixel is sequential placed for Px6, Px8, and Px10, all of which has the value 1 as the corresponding number of pixels. Subsequently, as pixels that make up the area 3, one pixel is sequential placed for Px11, Px12, and Px13, all of which has the value 1 as the corresponding number of pixels, followed by the placement of two pixels for Px14, which has the value 2 as the corresponding number of pixels and the subsequent placement of one pixel for Px15, which has the value 1 as the corresponding number of pixels. The re-arrangement of pixels for one line explained above is performed for each line. As a result, each expansion area of the target image is expanded by the scaling factor of ×1.2 whereas the compression area of the target image is compressed by the scaling factor of ×0.6.

In S750, the one-direction deformation module 230 judges whether the re-arrangement of pixels has been completed for all lines of the target image or not. If it is judged that the re-arrangement of pixels has been completed for all lines of the target image, the one-direction deformation processing ends. As a consequence thereof, image correction processing according to the present embodiment of the invention illustrated in the flowchart of FIG. 2 ends. On the other hand, if it is judged that the re-arrangement of pixels has not been completed for all lines of the target image yet, the process returns to S740. Then, the steps of S740 and S750 are repeated until the completion of the re-arrangement of pixels for all lines of the target image.

In S760, the one-direction deformation module 230 draws partition lines that extend in a direction orthogonal to the vertical direction of a target image so as to partition the area of the target image into a compression area and expansion areas. In S770, as done in S730, the one-direction deformation module 230 generates the corresponding-number-of-pixels table 410 with the use of a scaling factor for the compression area and a scaling factor for the expansion areas. When the deformation direction is the vertical direction, the corresponding-number-of-pixels table 410 that defines the corresponding number of pixels for each of pixels aligned in the vertical direction of the target image (i.e., each line extending in the vertical direction) is generated. An explanation as to how the corresponding number of pixels is determined is omitted here because it is the same as that of S730.

In S780, the one-direction deformation module 230 places line(s) of the target image in a deformed-image storage area allocated in the buffer space while looking up the corresponding-number-of-pixels table. When the deformation direction is the horizontal direction, the re-arrangement of pixels is performed in accordance with the corresponding number of pixels (e.g., 0, 1, 2, or the like) set for each pixel on a pixel-by-pixel basis. In contrast, when the deformation direction is the vertical direction, the placement is performed in accordance with the corresponding number of pixels set for each line on a line-by-line basis. Specifically, the one-direction deformation module 230 adds, for one line of the target image stored in the buffer space, line(s) for the corresponding number of pixels, which corresponds to the one line, to the deformed-image storage area allocated in the buffer space.

In S790, the one-direction deformation module 230 judges whether the processing of S780 has been completed for all lines of the target image or not. If it is judged that the processing of S780 has been completed for all lines of the target image, the one-direction deformation processing ends. As a consequence thereof, the processing flow illustrated in the flowchart of FIG. 2 ends. On the other hand, if it is judged that the processing of S780 has not been completed for all lines of the target image yet, the process returns to S780. Then, the steps of S780 and S790 are repeated until the completion of the processing of S780 for all lines of the target image.

As explained above, as a result of the one-direction deformation processing performed in S700, the compression area AC (an area that includes a face image) of the target image TI, which was set on the basis of the width of the transformation area TA, is compressed in the deformation direction, whereas the expansion areas AE thereof are expanded in the deformation direction. Therefore, as illustrated in the part B of FIG. 13, the person P1 in the deformed image TI' becomes slenderized in its entire figure from the person P1 in the target image TI, which has not yet been subjected to the one-direction deformation processing. That is, the former looks slimmer than the latter. As explained earlier, the face of the person P1 becomes deformed in a contracting manner to some degree in the face-height direction and in an expanding manner to some degree, for example, as if it became obese, in the face-width direction in the process of the face deformation processing of S600. Therefore, in the deformed image TI' obtained as a result of applying the sliming correction processing according to the present embodiment of the invention including the face deformation processing and the one-direction deformation processing to the target image TI, while the entire person image after deformation looks slimmer in terms of his/her body shape, the degree of the slimming of a face is more moderate in comparison with the degree of slimming of a body. Generally speaking, among the entire figure of a person, a face is a part that especially catches the eye of a user who observes an image. For this reason, if the vertical-to-horizontal ratio of a face changes substantially through image correction processing, a user will feel that the processed image is strange or unnatural. In this respect, the sliming correction processing according to the present embodiment of the invention does not change the vertical-to-horizontal ratio of a face substantially when the face image after the processing is compared with the original face image, it is possible to create a processed image that is not perceived by a user as strange nor unnatural.

In the foregoing description of an exemplary embodiment of the invention, it is explained that the one-direction deformation processing is performed as S700 after the face deformation processing, which is performed as S600. However, the sequential order of the execution of these processing is not limited to the specific example explained above. That is, the face deformation processing may be performed after the one-direction deformation processing. In such a modified processing flow in which the sequential order of the execution of the face deformation processing and the one-direction deformation processing is reversed, the processing flow of the flowchart illustrated in FIG. 2 ends after the completion of the one-direction deformation processing (S600) if judged as "NO" in S500.

In the sliming correction processing according to the present embodiment of the invention, various considerations are given in order to obtain a well-balanced image when viewed as a whole while avoiding an excessive change in the vertical-to-horizontal ratio of a face in a target image. As explained earlier, instead of using the 100% value of a compression rate that is to be used in the one-direction deformation processing as the amount of deformation (i.e., the amount of expansion) of an image in a deformation target area in the H direction, some value of the compression rate that corresponds to a predetermined allocation percentage is used as the amount of deformation of the image in the deformation target area in the H direction. If the expansion effects of the face deformation processing are excessively large, for example, too large to offset almost all of the compression effects of the one-direction deformation processing, there is a possibility that a balance between the size of a face and the size of a body is very poor in a person image obtained as a result of the sliming correction processing. That is, if the expansion effects of the face deformation processing are so large, the body part of the person only, which excludes the face part thereof, might look slim unnaturally. In order to avoid such unbalanced correction, the expansion of a face in the face-width direction in the face deformation processing is performed moderately so that the compression of compression areas in the one-direction deformation processing out-effects the expansion of an expansion area to some degree.

In the foregoing description of an exemplary embodiment of the invention, it is explained that, in the determination of the amount of movement of the division points D, the face deformation module 240 may determine the movement amount that differs from one division point D to another. As an example thereof, the face deformation module 240 may limit the amount of movement in the H direction that is applied to outer face areas each of which is located outside face organs such as eyes, a nose, and a mouth. For example, the amount of movement applied to the outer face areas such as cheek areas and in the neighborhood thereof as well as a chin area and in the neighborhood thereof in an orientation away from the reference line RL may be relatively small. Specifically, for example, as for the division points D11 and D12, which are located on the vertical division line Lv1, and the division points D21 and D22, which are located on the vertical division line Lv2, the face deformation module 240 may set the amount of movement in the H direction for the relatively outer division points D11 and D12 at a value that is smaller than the amount of movement in the H direction that is set for the relatively inner division points D21 and D22. In addition, the face deformation module 240 may set the amount of movement in the H direction for the division points D11 and D21 located near the chin at a relatively small value. In such a case, the amount of movement in the H direction is set for each of the counterpart division points D located at the left side of the face, specifically, the division points D31 and D32 located on the vertical division line Lv3 and the division points D41 and D42 located on the vertical division line Lv4 in a symmetric manner.

If the amount of movement in the H direction for the division points D11 and D12 located on the vertical division line Lv1 and the amount of movement in the H direction for the division points D41 and D42 located on the vertical division line Lv4 is set to be smaller than the amount of movement in the H direction for the division points D21 and D22 located on the vertical division line Lv2 and the amount of movement in the H direction for the division points D31 and D32 located on the vertical division line Lv3, respectively, while these division points D respectively move in an orientation away from the reference line RL so as to expand a face image in the direction of the width of a face as a result of the face deformation processing, the distance between the point of division D'11 and the point of division D'21 as well as the distance between the point of division D'12 and the point of division D'22 after the movement is smaller than the distance between the point of division (D11) and the point of division (D21) as well as the distance between the point of division (D12) and the point of division (D22) before the movement. In like manner, the distance between the point of division D'41 and the point of division D'31 as well as the distance between the point of division D'42 and the point of division D'32 after the movement is smaller than the distance between the point of division (D41) and the point of division (D31) as well as the distance between the point of division (D42) and the point of division (D32) before the movement. A processed face image obtained as a result of the compression of an entire person image in the deformation direction through the one-direction deformation processing performed after, or before, the face deformation processing is compressed as a whole. Among others, an image area defined by the division points D'11, D'12, D'22, and D'21 after the face deformation processing is narrower than an image area defined by the division points (D11), (D12), (D22), and (D21) before the face deformation processing. In addition, an image area defined by the division points D'41, D'42, D'32, and D'31 after the face deformation processing is narrower than an image area defined by the division points (D41), (D42), (D32), and (D31) before the face deformation processing.

The image area defined by the division points D'11, D'12, D'22, and D'21 and the image area defined by the division points D'41, D'42, D'32, and D'31 constitute a face-line area that includes the contour of a right cheek, a chin, and a left cheek. Since an original face-line area is deformed into a narrower area, it is possible to obtain a firm face image that shows cheeks and a chin that do not look flabby as a result of the sliming correction processing. Moreover, if the amount of movement of the division points D11, D21, D31, and D41, which are located near a chin, in the H direction is set to be smaller than the amount of movement of the division points D12, D22, D32, and D42, which are located near cheeks, as a result of the sliming correction processing, it is possible to obtain a face image that shows the chin whose width is reduced, which makes a sharp impression on a user who observes the image.

3. Another Embodiment

Next, an explanation is given below of processing that is performed when the image correction processing block 200 has judged in S200 that the execution of the "sliming correction processing in combination with face-size reduction correction" is instructed through the operation of the corresponding button(s) of the UI by a user. The "sliming correction processing in combination with face-size reduction correction" differs from the sliming correction processing explained above in the processing of S600 in the face deformation processing. Therefore, in the following description of the present embodiment of the invention, the face deformation processing in the "sliming correction processing in combination with face-size reduction correction" is explained.

The difference between the face deformation processing in the sliming correction processing and the face deformation processing in the "sliming correction processing in combination with face-size reduction correction" lies in the amount of movement determined for the division points D in S630. Specifically, in the face deformation processing in the "sliming correction processing in combination with face-size reduction correction", the face deformation module 240 sets, for at least some division points D, a smaller amount of movement in an orientation away from the reference line RL along the H direction in comparison with the amount of movement set in the sliming correction processing. In addition, in the face deformation processing in the "sliming correction processing in combination with face-size reduction correction", the face deformation module 240 sets, for at least some division points D, such amount of movement that makes the face of a person in an image look smaller. In the setting of such movement amount, as done in the movement-amount setting in the face deformation processing in the sliming correction processing, the face deformation module 240 separates the value of a compression rate into the amount of deformation of an image in the H direction and the amount of deformation of the image in the V direction in accordance with a predetermined allocation percentage. The face deformation module 240 further separates the value allocated to the amount of deformation of the image in the H direction and the value allocated to the amount of deformation of the image in the V direction and then sub-allocates the after-the-separation values to the respective division points D as the amount of movement. Thereafter, the face deformation module 240 adjusts the amount of movement of each division point D.

FIG. 16 is a table that shows an example of the amount of movement of the division points D determined by the face deformation module 240 at the time of the execution of the face deformation processing in the "sliming correction processing in combination with face-size reduction correction" according to the present embodiment of the invention. In FIG. 16, the movement amount of each division point D is expressed as a pixel pitch value as in FIG. 9. In the table of FIG. 16, for example, the amount of movement of the division points D12 and D42 in the H direction, that is, the amount of movement of these division points in an orientation away from the reference line RL, is set to be smaller each in terms of an absolute value than the amount of movement thereof set in the face deformation processing in the sliming correction processing (refer to FIG. 9). In addition, in the table of FIG. 16, the amount of movement of the division points D11, D21, D31, and D41 located on the horizontal division line Lh1 in the H direction is set at such amount of movement that represents an orientation toward the reference line RL unlike the amount of movement thereof in the H direction set in the face deformation processing in the sliming correction processing (refer to FIG. 9). Moreover, the amount of movement of these division points D11, D21, D31, and D41 in the positive V direction is substantially larger than the amount of movement thereof in the positive V direction set in the face deformation processing in the sliming correction processing (refer to FIG. 9).

Figure 17:
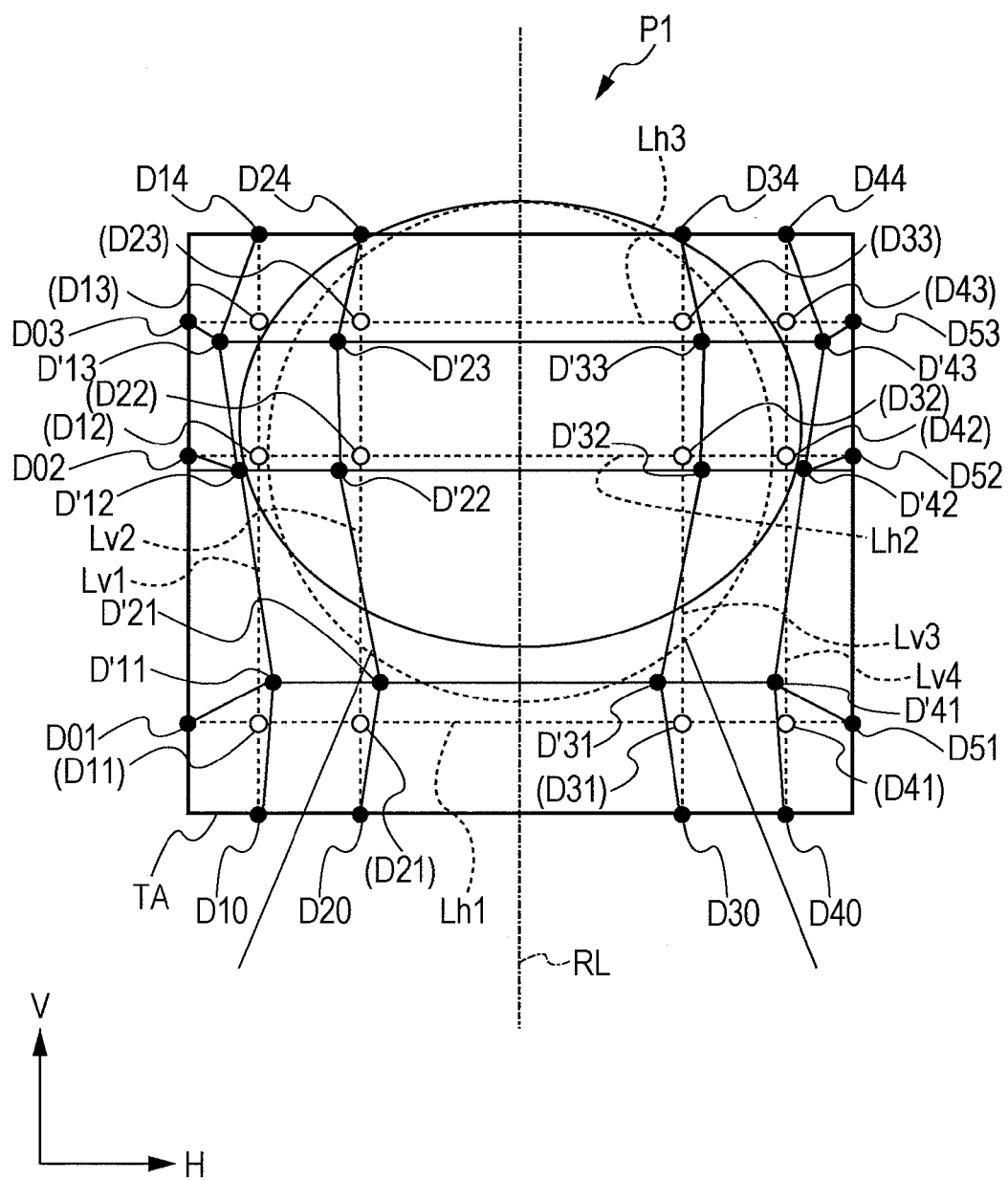
FIG. 17 is a diagram that schematically illustrates an example of the deformation of an image in a deformation area through face deformation processing according to an embodiment of the invention.

FIG. 17 is a diagram that schematically illustrates an example of the deformation of an image in the transformation area TA, which occurs when the face deformation module 240 moves, in S640, each division point D in accordance with the movement amount determined for the division point D as illustrated in FIG. 16. For the purpose of comparative explanation, in FIG. 17, the contour of the face of the person P1 before deformation processing is shown by a broken line, whereas the contour of the face of the person P1 after deformation processing is indicated with a solid line as in FIG. 10. In addition, in FIG. 17, each division point after movement is denoted with an apostrophe, for example, as in D'11, whereas each division point before movement is denoted with a round bracket, for example, as in (D11). The positions of the division points before movement are shown as small open circles as in FIG. 10. As illustrated in FIG. 17, as for the direction parallel to the extending direction of the reference line RL, that is, the V direction, the division points D11, D21, D31, and D41 located on the horizontal division line Lh1 are moved upward, whereas the division points D12, D22, D32, and D42 located on the horizontal division line Lh2 and the division points D13, D23, D33, and D43 located on the horizontal division line Lh3 are moved downward. Herein, the amount of movement of the division points D11, D21, D31, and D41 in the positive V direction is larger than the amount of movement thereof in the positive V direction in the face deformation processing in the sliming correction processing. For this reason, the image part between the horizontal division line Lh1 and the horizontal division line Lh2, which corresponds to an area extending from somewhere below and under a chin to somewhere below and under eyes, are compressed in the V direction with compression effects that are greater than those produced in the face deformation processing in the sliming correction processing.

As a result of the movement of the division points D in S640 in the direction perpendicular to the extending direction of the reference line RL, that is, in the H direction, the division points D12 and D13 located on the vertical division line Lv1 are moved to the left, whereas the division points D42 and D43 located on the vertical division line Lv4 are moved to the right. In addition, the division points D22 and D23 located on the vertical division line Lv2 are moved to the left, whereas the division points D32 and D33 located on the vertical division line Lv3 are moved to the right. However, the amount of movement of the division point D12 in the negative H direction and the amount of movement of the division point D42 in the positive H direction are smaller than the amount of movement thereof in the H direction in the face deformation processing in the sliming correction processing, respectively. For this reason, the degree of expansion of the width of a face image at cheeks and in the neighborhood thereof heightwise, that is, when viewed along the height of a face in the face deformation processing in the "sliming correction processing in combination with face-size reduction correction" is smaller than that of the face deformation processing in the sliming correction processing.

Moreover, each orientation of the H-directional movement of the division points D11, D21, D31, and D41 arrayed on the horizontal division line Lh1 in the face deformation processing in the "sliming correction processing in combination with face-size reduction correction", which is indicated by the movement amount thereof, is opposite to the orientation of H-directional movement indicated by movement amount in the face deformation processing in the sliming correction processing. Therefore, the width of a face image at a chin and in the neighborhood thereof is compressed as a result of the face deformation processing in the "sliming correction processing in combination with face-size reduction correction". As explained above, in the face deformation processing in the "sliming correction processing in combination with face-size reduction correction", the degree of expansion of the width of a face is lesser in comparison with that of the face deformation processing in the sliming correction processing. In addition, the size of an area of a face below and under eyes is especially reduced, which makes the face look smaller. Therefore, in a deformed image obtained as a result of applying the "sliming correction processing in combination with face-size reduction correction" according to the present embodiment of the invention including the face deformation processing and the one-direction deformation processing to a target image, while the entire person image after deformation looks slimmer in terms of his/her body shape, the degree of the slimming of a face is basically more moderate in comparison with the degree of slimming of a body. In addition, the degree of compression of an area below and under eyes in a face image, including but not limited to, cheeks, a chin, and the vicinity thereof in the face-height direction and the face-width direction is greater in comparison with that of the face deformation processing in the sliming correction processing. Thus, it is possible to produce face-size reduction correction effects.

What is claimed is:

1. An image processing apparatus comprising a processor and a non-transitory computer-readable medium: the non-transitory computer readable medium comprising:
   an area setting module, wherein the area setting module sets, in a target image that includes a face image, an area including the face image as a compression area, wherein the face image comprising a plurality of face parts is divided into a plurality of face part areas;
   an image deforming module, wherein the image deforming module compresses the compression area in a specific direction at a predetermined compression rate; and
   a face deforming module, wherein the face deforming module:
   sets a transformation area including at least one face part area of the plurality of face part areas, determines a layout for a plurality of division points, determines an amount of movement in the plurality of division points based on the compression rate, and moves the plurality of division points, thereby deforming the face image by an expansion amount determined on the basis of the compression rate in such a manner that at least a part of the face image is expanded in the specific direction.

2. The image processing apparatus according to claim 1, further comprising an instruction receiving module, wherein the instruction receiving module receives an instruction given from the outside for making a face look smaller, wherein the face deforming module reduces the expansion amount that is applied to the at least a part of the face image when the instruction receiving module has received the instruction.

3. The image processing apparatus according to claim 1, wherein the face deforming module determines the expansion amount on the basis of a value that is calculated as a predetermined percentage of a value of the compression rate.

4. The image processing apparatus according to claim 3, wherein the face deforming module determines a compression amount on the basis of a value that remains after subtracting the predetermined percentage value from the value of the compression rate and then deforms the face image by the determined compression amount so as to compress at least a part of the face image in a direction orthogonal to the specific direction.

5. The image processing apparatus according to claim 1, wherein the face deforming module limits the amount of expansion applied to an area outside a predetermined face organ.

6. The image processing apparatus according to claim 1, wherein the area setting module divides the target image into the compression area and an area excluding the compression area with the use of a line orthogonal to the specific direction.

7. The image processing apparatus according to claim 1, wherein the face deforming module further:
   arranges the plurality of division points on the transformation area, wherein the division points are arranged and a number of division points used are determined by looking up a pre-defined division point arrangement pattern table;
   divides the transformation area into a plurality of sub areas by connecting lines based on the division points; and
   deforms each sub area in the transformation area in a horizontal and a vertical direction based on a horizontal compression rate and a vertical compression rate.

8. The image processing apparatus according to claim 7, wherein a horizontal compression rate is determined by a predetermined allocation ratio of the compression rate and a vertical compression rate is determined by subtracting the horizontal compression rate from the compression rate.

9. The image processing apparatus according to claim 8, wherein the horizontal compression rate and the vertical compression rate for each sub area is different.

10. An method for image processing using a computer comprising: setting, in a target image that includes a face image, an area including the face image as a compression area;
    deforming at least a part of the face image;
    compressing the compression area in a specific direction at a predetermined compression rate for image deformation, wherein, in the deformation of the face image, the face image is deformed by an expansion amount determined on the basis of the compression rate in such a manner that at least a part of the face image is expanded in the specific direction;
    setting a transformation area including a part of the face image; determining a layout for a plurality of division points; arranging the plurality of division points on the transformation area; dividing the transformation area into a plurality of sub areas by connecting lines based on the division points; determining an amount of movement in the plurality of division points based on the compression rate; and deforming each sub area in the transformation area based on the compression rate.

11. The method according to claim 10, further comprising receiving an instruction given for making a face look smaller, wherein the deformation of the face image reduces the expansion amount that is applied to the at least a part of the face image.

12. The method according to claim 10, further comprising determining the expansion amount on the basis of a value that is calculated as a predetermined percentage of a value of the compression rate.

13. The method according to claim 12, wherein the deformation of the face image includes determining a compression amount on the basis of a value that remains after subtracting the predetermined percentage value from the value of the compression rate and then deforming the face image by the determined compression amount so as to compress at least a part of the face image in a direction orthogonal to the specific direction.

14. The method according to claim 10, further comprising limiting the amount of expansion applied to an area outside a predetermined face organ.

15. The method according to claim 10, further comprising: dividing the target image into the compression area; and excluding the compression area with the use of a line orthogonal to the specific direction.

16. The method according to claim 10, wherein the division points are arranged and a number of division points used are determined by looking up a pre-defined division point arrangement pattern table, further wherein each sub area in the transformation area is deformed in a horizontal and a vertical direction based on a horizontal compression rate and a vertical compression rate.

17. The method according to claim 16, wherein a horizontal compression rate is determined by a predetermined allocation ratio of the compression rate and a vertical compression rate is determined by subtracting the horizontal compression rate from the compression rate.

18. The method according to claim 17, wherein the horizontal compression rate and the vertical compression rate for each sub area is different.

19. An computer program product for processing an image comprising:

a non-transitory computer readable medium; and a computer readable program stored on the non-transitory computer readable medium, the computer readable program including:

a program for causing a computer to set, in a target image that includes a face image, an area including the face image as a compression area, wherein the face image comprising a plurality of face parts is divided into a plurality of face part areas;

a program for causing a computer to compress the compression area in a specific direction at a predetermined compression rate for image deformation; and a program for causing a computer to:

set a transformation area including at least one face part area of the plurality of face part areas, determine a layout for a plurality of division points, determine an amount of movement in the plurality of division points based on the compression rate, and move the plurality of division points, thereby deforming the face image by expansion amount determined on the basis of the compression rate in such a manner that at least a part of the face image is expanded in the specific direction.

* * * * *